United States Patent [19]

Sarh

[11] Patent Number: 4,881,700
[45] Date of Patent: Nov. 21, 1989

[54] CONVERTIBLE FIXED WING AIRCRAFT

[76] Inventor: Branko Sarh, 2597 Devonshire Rd., Riverside, Calif. 92506

[21] Appl. No.: 141,096

[22] Filed: Jan. 5, 1988

[51] Int. Cl.⁴ .......................... B64C 3/56; B64C 37/00
[52] U.S. Cl. .......................................... 244/2; 244/218
[58] Field of Search ..................... 244/2, 49, 218, 101, 244/105

[56] References Cited

U.S. PATENT DOCUMENTS

| | | | |
|---|---|---|---|
| Re. 25,368 | 4/1963 | Rethorst | 244/2 |
| 2,548,832 | 4/1951 | Tydon | 244/105 |
| 2,893,661 | 7/1959 | Aylor | 244/2 |
| 3,371,886 | 3/1968 | Schertz | 244/2 |
| 4,579,297 | 4/1986 | Ayoola | 244/2 |

FOREIGN PATENT DOCUMENTS 566301 11/1958 Canada ..................... 244/2

*Primary Examiner*—Joseph F. Peters, Jr.
*Assistant Examiner*—Rodney Corl
*Attorney, Agent, or Firm*—Herbert E. Kidder

[57] ABSTRACT

A fixed wing aircraft that can be converted to an automotive vehicle, comprising a generally rectangular planform fuselage having four wheels as in conventional automobile practice, and a telescopic wing which retracts into a housing in the roof of the fuselage. Telescopic horizontal and vertical stabilizers are provided at the rear end of the fuselage, as well as a retractable pusher propeller that is driven by an engine mounted on the front end of the fuselage. Both the propeller and the rear wheels are connected by a transmission box to the engine, so that either can be driven to operate the vehicle as an aircraft or as an automobile. On take-off, the rear wheels are partially retracted so as to place the aircraft at a proper angle of attack at the same time that the elevators are raised by pulling back on the control wheel. The control wheel is also connected to both the front wheels and the ailerons, and when turned 90° to the left or right while in the flight configuration, causes the ailerons to move to their extreme angular positions while the front wheels are turned only a minimal amount. Further turning of the control wheel causes the front wheels to turn to their full angular position, without causing further movement of the ailerons. The wing is also movable longitudinally with respect to the fuselage so as to trim the aircraft for shirts in the center of gravity with varying load conditions.

11 Claims, 21 Drawing Sheets

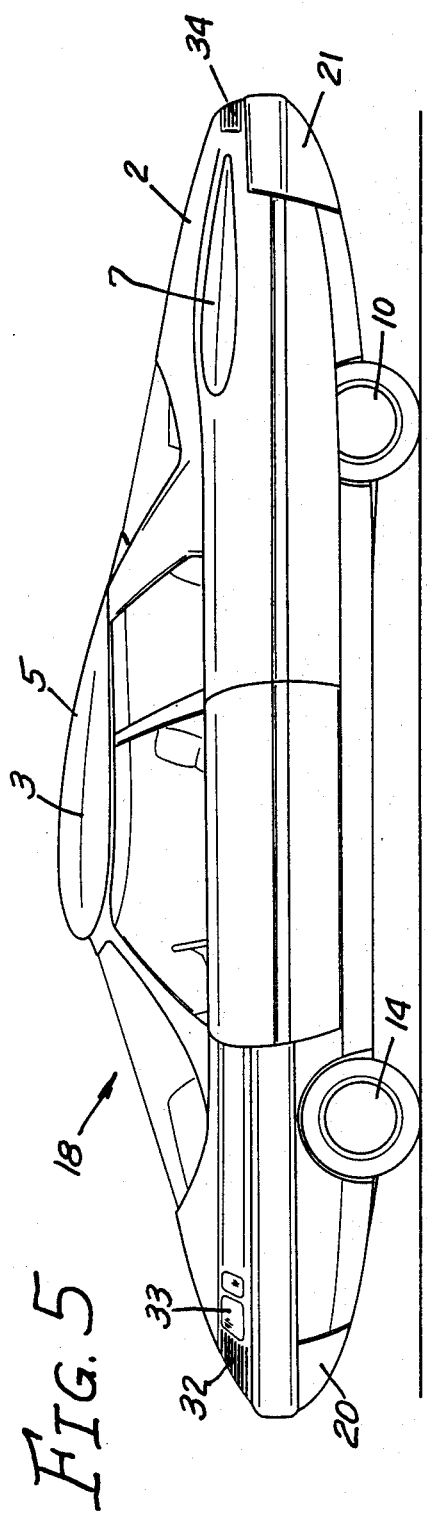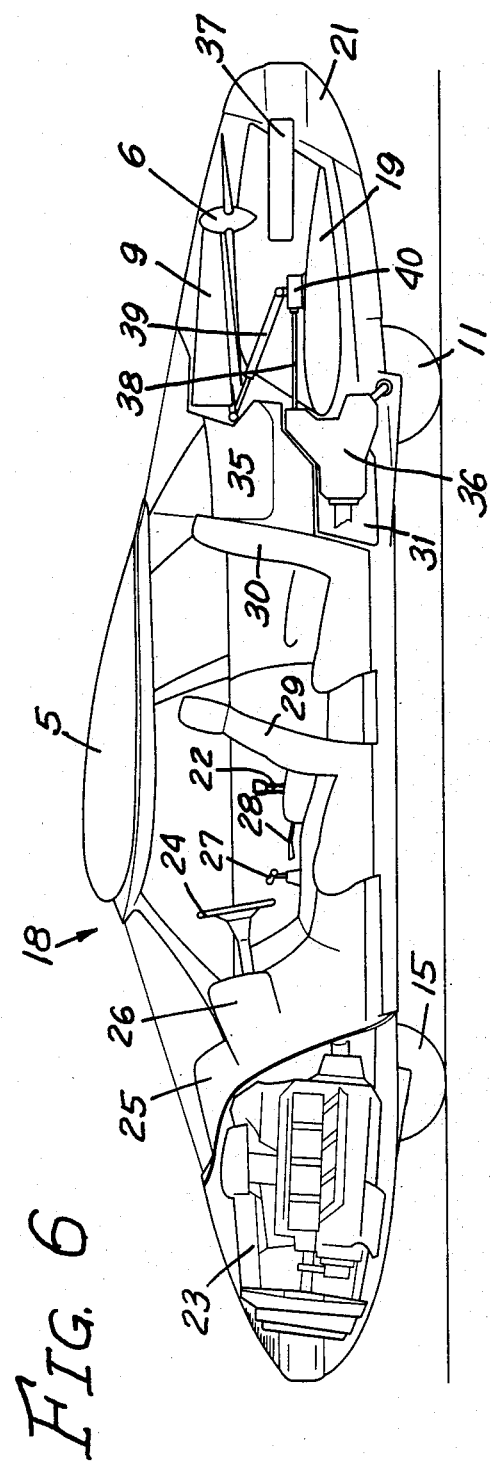

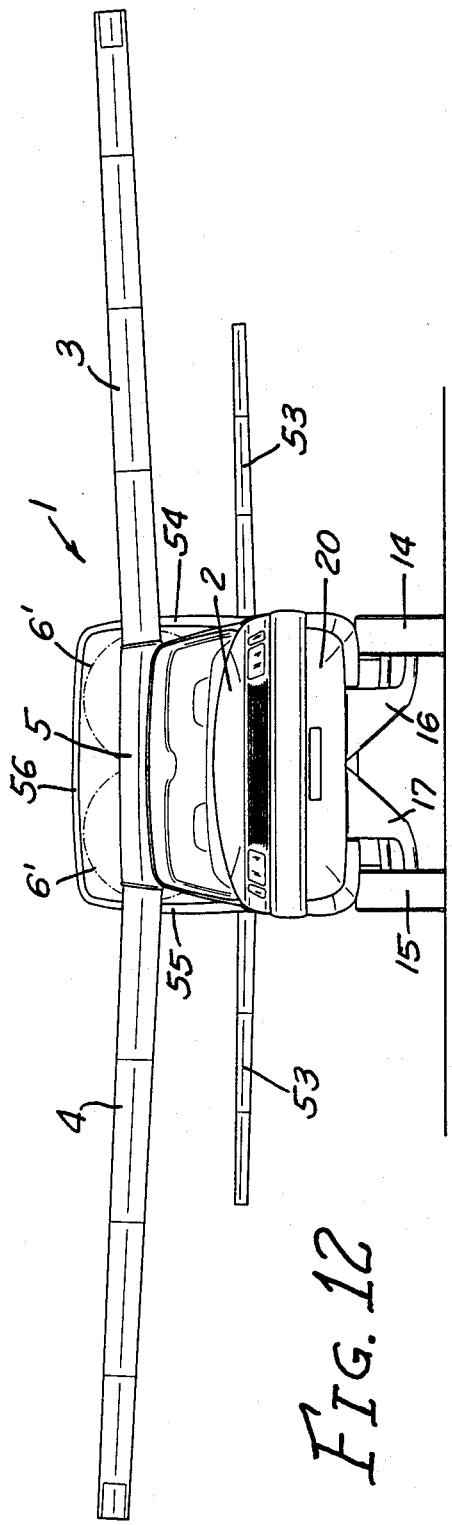
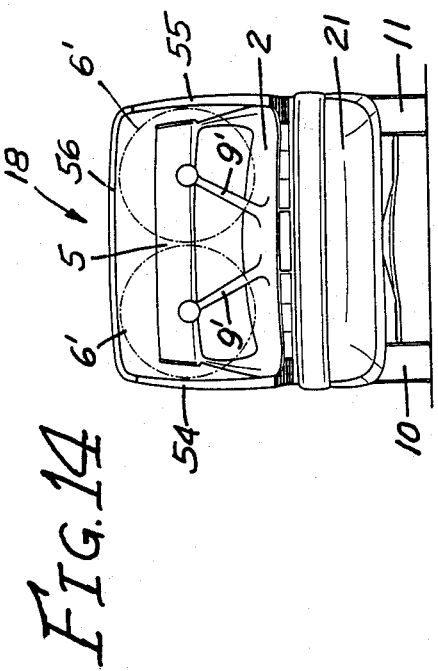
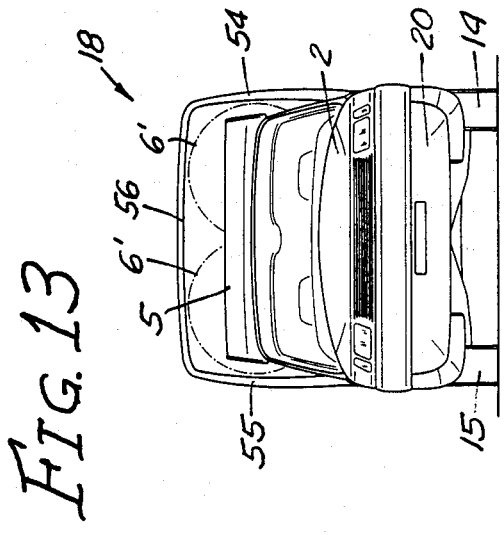
FIG. 12
FIG. 13
FIG. 14

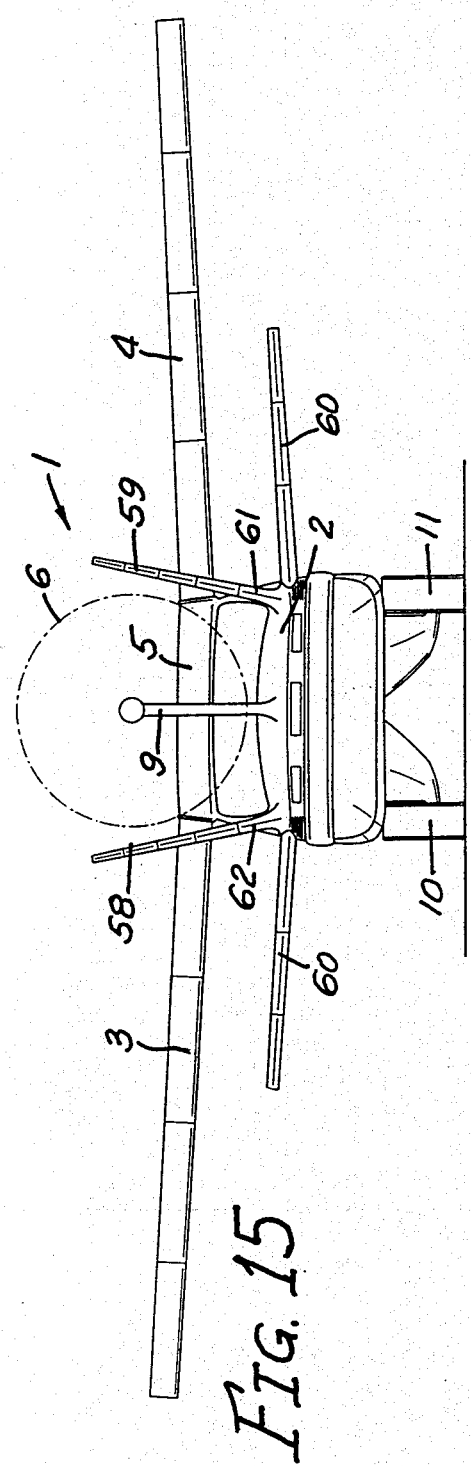
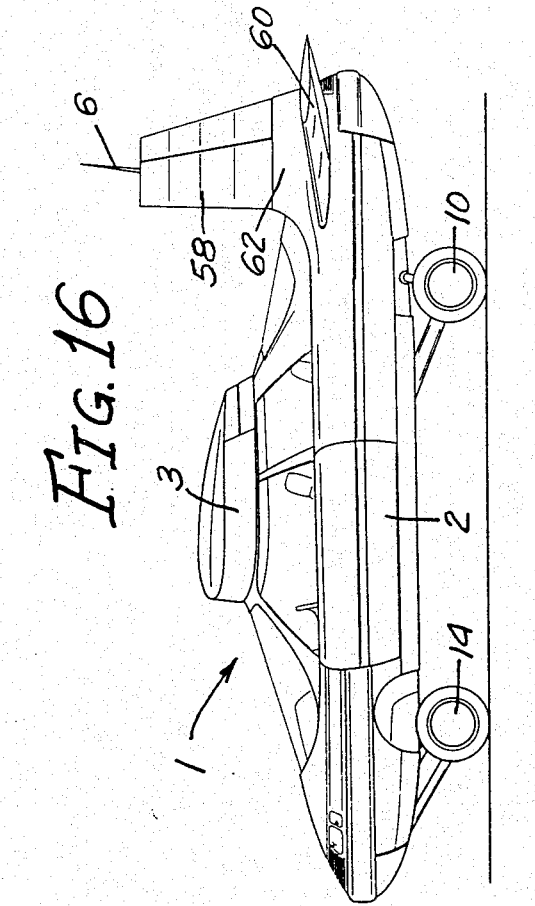
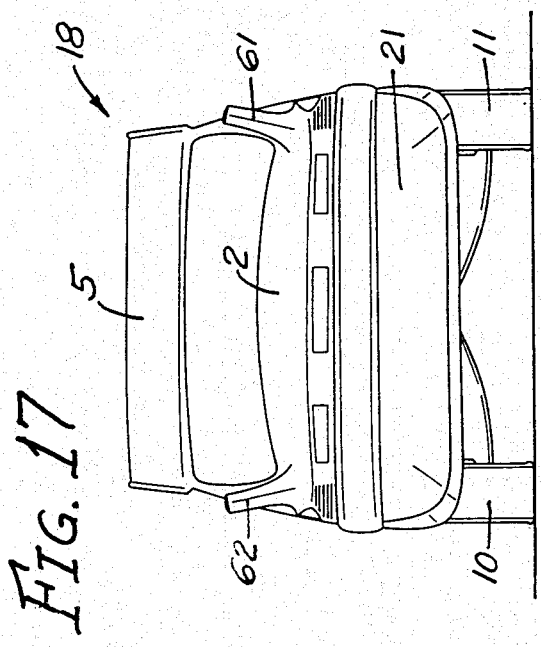

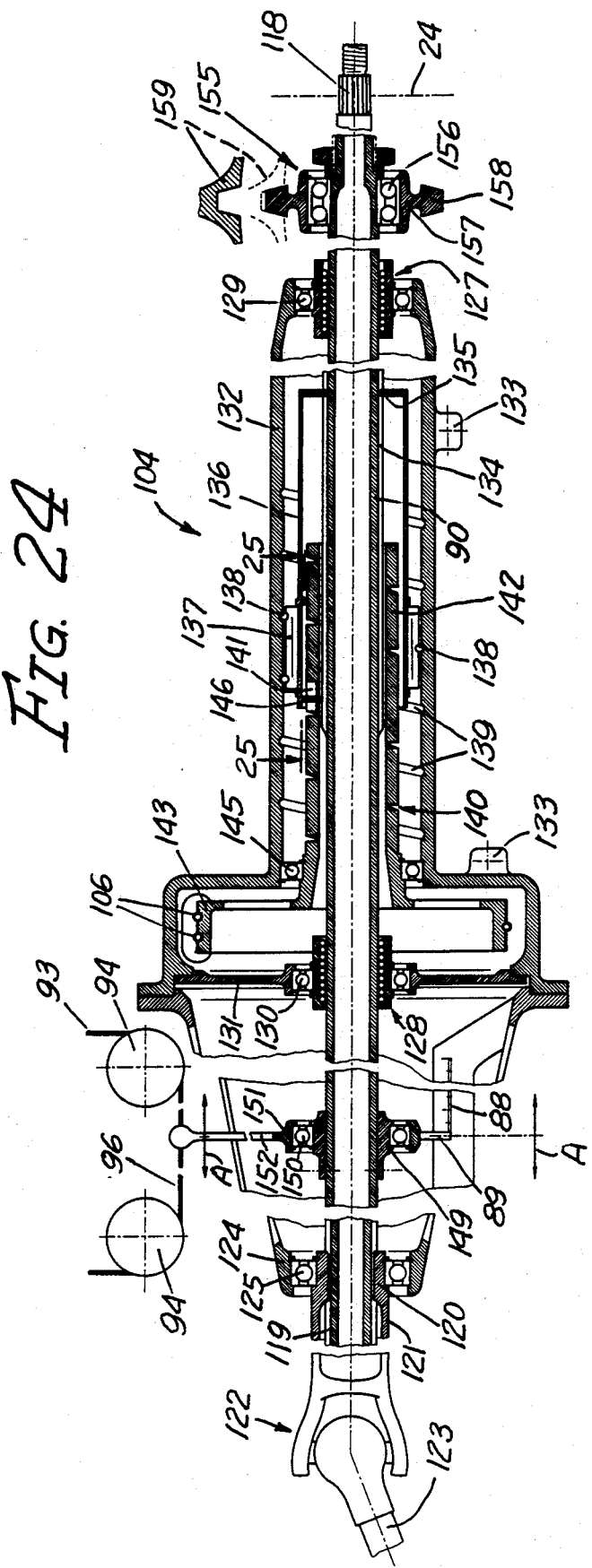

CONVERTIBLE FIXED WING AIRCRAFT

BACKGROUND OF THE INVENTION:

The present invention pertains to convertible fixed wing aircraft of the type that can be flown as a more-or-less conventional fixed wing aircraft, or converted to an automotive vehicle. The idea of a single vehicle that can function as an aircraft to cover long distances in the shortest time, and then as a highway vehicle that can be driven from the airport to the ultimate destination, is an attractive one. However, there are many problems that make this ideal concept difficult to realize, and while many have attempted to design such a vehicle, there has never been a successful product that has reached the market.

The problem has been in integrating the functions and structural requirements of the two vastly different vehicles into a single, user-friendly construction that requires a minimum of human intervention in switching from the automotive to the aircraft configuration. The technological bases for both individual systems are highly developed, and it is necessary that this high level of technology for both systems be incorporated in a single system while maintaining the performance of these different systems.

The structural design requirements for an aircraft are quite different from those of an automobile, particularly in the matter of weight, which must be held to the minimum level, whereas in an automobile, weight is not nearly as important a consideration, although the present tendency is toward lighter weight automobiles for fuel efficiency reasons. On the other hand, safety requirements for automobiles make energy absorption zones in the form of front and rear bumpers an absolute necessity, whereas in an airplane there is no need for such devices, as the airplane operates in open space, far removed from pedestrians and other traffic.

In automobiles, the standard body configuration is rectangular in planform, with four wheels positioned adjacent the four corners, and the center of gravity located more or less centrally between the wheels for maximum road stability. In aircraft, on the other hand, the fuselage is elongated and usually provided with tricycle landing gear, with one front wheel in the nose of the aircraft, and two main wheels located closely adjacent the center of gravity. This arrangement is necessary to provide a short moment arm between the center of gravity and the main wheels, while the elongated fuselage provides a long moment arm between the main wheels and the elevators, so that a relatively small downward force by the elevators is able to overcome the moment created by the weight of the aircraft at the center of gravity, to tilt the nose of the airplane up to the high angle-of-attack attitude for liftoff.

Another distinctive difference between aircraft and automobiles is that airplanes have wings that extend laterally for a considerable distance to each side of the fuselage, and a tail structure including horizontal and vertical stabilizers, that extends rearwardly for a considerable distance behind the main wheels, whereas in automobiles the body must be compact, usually no more than six feet in width, and at most not more than eight-feet, to meet highway legal requirements, with a minimum overhang behind the rear wheels.

Aerodynamic requirements of an airplane are much higher than those of an automobile, primarily because of the different speeds at which the two operate. The aerodynamic drag of an automobile body is many times that of an airplane fuselage, due in part to the unstreamlined underbody, with all of the exposed power transmission and suspension gear.

Steering controls for aircraft are quite different from those for automobiles, in that turns are made by use of pedal-controlled rudders and wheel-controlled ailerons, whereas in an automobile turns are made by merely turning the front wheels with the steering wheel. The automobile steering wheel must be turned almost two full turns to the left or right to obtain maximum turning of the front wheels, while in aircraft the ailerons are deflected to the maximum position with only approximately ninety degrees turn of the wheel to either side. One of the primary problems in designing a convertible airplane is integrating the steering controls for both automotive and aircraft use, using only one control wheel, without requiring the operator to manipulate some kind of device in switching from one mode of control to the other. The airplane's elevators are also operated by pulling and pushing the control wheel.

Braking systems for aircraft and automobiles are also entirely different from one another. In the airplane, brakes on the main wheels are separately and independently controlled by tilting the left or right rudder pedals so as to brake the left or right main wheel. In this way, the airplane is made to turn on the ground. To brake the airplane without turning, both rudder pedals are tilted forwardly the same amount. Combining the rudder and brake controls in the same pedals is essential during the landing operation, so that the pilot is enabled to control both rudder and brakes. With the automobile, depressing the brake pedal actuates all four brakes simultaneously. The problem is how to fulfull all of these functions without confusing the pilot or driver who is used to both of these arrangements.

Another difference in the control systems for the two different types of vehicles is that in aircraft, the engine speed is controlled by a manually operated throttle lever, whereas in the automobile the engine speed is controlled by a foot-operated accelerator pedal.

Still another difference is that in aircraft the fuel is carried in the wing, relatively close to the center of gravity, therefore as the fuel is used up there is very little shift in the location of the center of gravity. With an automobile, on the other hand, fuel is carried in tanks at the rear portion of the body for safety reasons, and as the fuel is used up there can be a more substantial shift in the center of gravity. Airplanes can be trimmed for the relatively minor shift in the center of gravity by trimming the elevator or horizontal stabilizer, with its relatively long moment arm, using a trim wheel.

SUMMARY OF THE INVENTION:

The present invention pertains to a convertible fixed wing aircraft which can be automatically converted from aircraft to automobile configuration, or vice versa, without manual structural modification, and having permanently connected control systems that are conventional for both aircraft and automotive use. At the same time, it is necessary to provide a vehicle that embodies the present-day level of technology for both aircraft and automobiles in a vehicle that is light in weight, simple to produce, and user-friendly.

The primary object of the invention is to provide a fixed wing convertible aircraft which embodies the above-mentioned characteristics, and which overcomes the shortcomings of prior art designs. This object is achieved by providing a vehicle body that is generally rectangular in planform, with a four wheel suspension, in which the two front wheels are steerable for use in the automotive configuration. The four wheels can be fully extended for aircraft operation, or partially retracted for automotive operation, and fully retracted in flight. Another important feature is that the rear wheels, in conjunction with the operation of the elevators, can be partially retracted at the moment of takeoff so as to tilt the airplane to the proper angle of attack for takeoff.

One of the most important features of the invention is that the wing is telescopically retracted body, where it is entirely out of the way of the passenger compartment to allow free entrance and exit from the vehicle, and occupies a minimum of storage space. The horizontal and vertical stabilizers are also retractable into the rear portion of the vehicle body, and a pusher propeller located at the rear is driven by the engine which is located at the front end.

The steering system is distinctly different from anything shown or described by the prior art in that the aileron control function and front wheel steering are integrated in a single, permanently connected control unit.

Another distinguishing feature of the present invention is in the pedal arrangement which provides left and right hand pedals for rudder control and individual rear wheel brake control in the aircraft configuration, with a third pedal, closely adjacent the right rudder pedal, which actuates all four brakes in the automotive configuration. A fourth pedal serves as the accelerator pedal. For aircraft use, a hand-operated throttle is provided. Thus, in flight the pilot has all the familiar controls that are used in conventional airplanes, while the driver of the automobile also has all of the familiar controls that are used in conventional automobiles.

The relatively short, rectangular planform body of the airplane results in location of the horizontal and vertical stabilizers a very short distance rearwardly of the wing, giving the elevators a short moment arm to the center of gravity to compensate for the moment of the wing lift to the center of gravity. To comply with automotive safety requirements, the fuel tank is placed in the rear portion of the body between its rear wheels. As a result, there is a substantial shift in the center of gravity between full tank and empty tank, which aggravates the problem of trimming by the elevators with their short moment arm. To resolve this problem, provision is made for shifting the wing along the lengthwise axis of the fuselage so as to compensate for any shift in center of gravity.

These and other objects and advantages of the invention will become apparent to those skilled in the art from the following detailed description of the preferred embodiments, with reference to the attached drawings.

BRIEF DESCRIPTION OF THE DRAWINGS:

FIG. 5 is a side elevation of the automotive configuration shown in FIG. 4;

FIG. 6 is a partially cut-away side view of the automotive configuration, showing some of the internal details;

FIG. 12 is a front view of the same;

FIG. 13 is a front view of the automotive configuration shown in FIG. 10;

FIG. 14 is a rear view of the automotive configuration shown in FIG. 10;

FIG. 15 is a rear view of another embodiment of the invention, shown in the aircraft configuration, having two spaced-apart vertical stabilizers with a single pusher propeller located between them, and laterally extending horizontal stabilizers;

FIG. 16 is a side elevation of the aircraft in FIG. 15;

FIG. 17 is a rear view of the embodiment of FIGS. 15 and 16, showing the same in the automotive configuration;

FIG. 24 is a cross-sectional view of the steering mechanism for the front wheels, and control for the ailerons and elevators, for producing the functional characteristics depicted in FIG. 23;

FIG. 28 shows the conventional aircraft in which the center of gravity moves due to changes in loading, and the trimming function is performed by the horizontal stabilizer; while FIG. 29 shows the present invention in which the center of lift is shifted with the center of gravity, thereby providing the trimming function;

Figure 1:
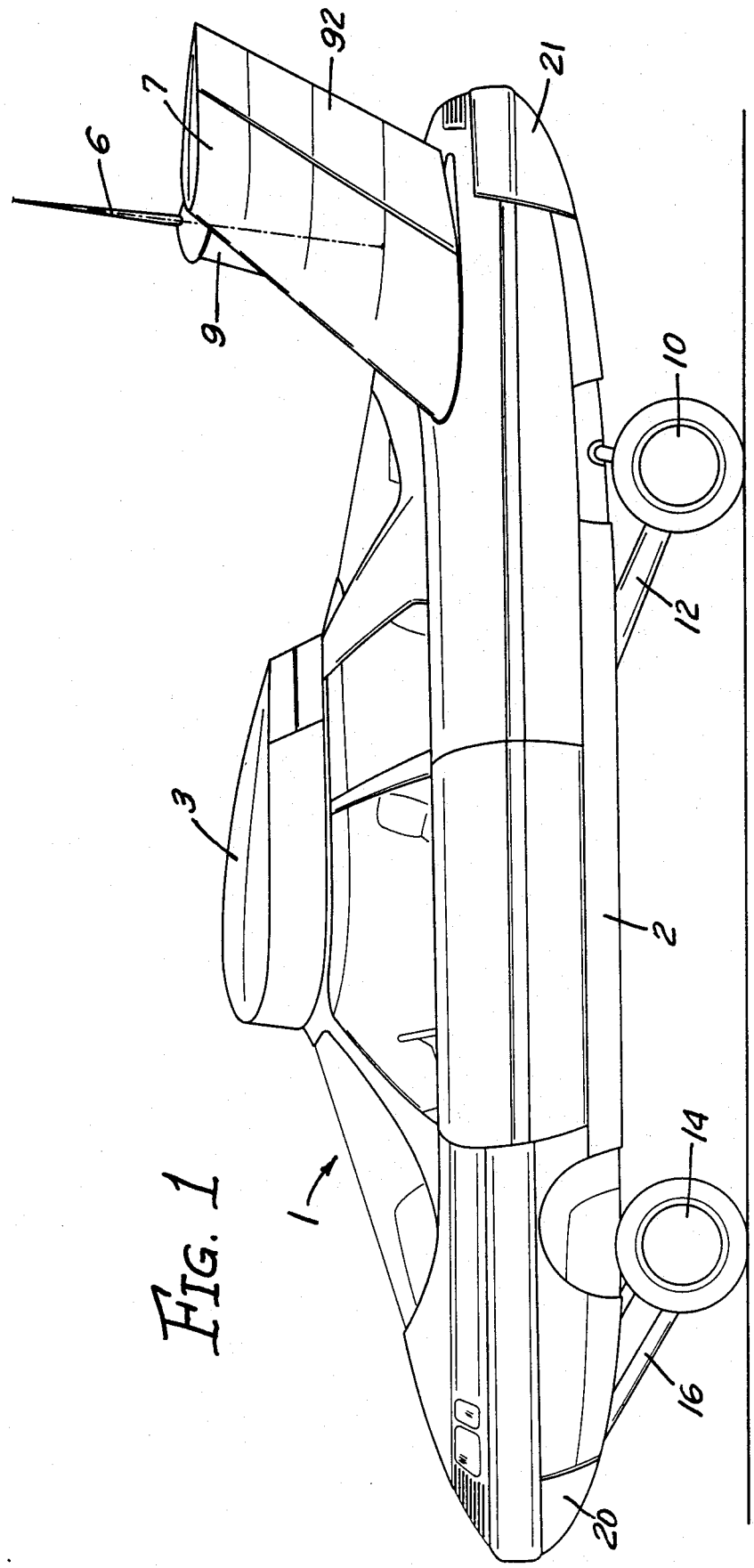
FIG. 1 is a side elevation of the convertible fixed wing aircraft of the invention embodying a V-tail, showing the vehicle in the aircraft configuration, with wings, tail, propeller, and wheels extended.

DESCRIPTION OF THE PREFERRED EMBODIMENTS:

FIGS. 1-5 show the first embodiment of the invention, and this description is directed to these figures. The fixed wing aircraft configuration of the invention is designated in its entirety by the reference numeral 1, and comprises a compact, generally rectangular planform fuselage 2 which is considerably shorter in length than the conventional aircraft. Projecting laterally from the fuselage in high wing configuration are telescopic wings 3 and 4, which can be retracted into a wing middle box 5. At the rear end of the fuselage is a telescopic V-tail 7 and 8, a propeller 6 carried by a pylon 9, and rear wheels 10 and 11, which are attached to the fuselage by arms 12 and 13. At the front end of the fuselage are steerable front wheels 14 and 15, which are attached to the fuselage by arms 16 and 17.

Figure 4:
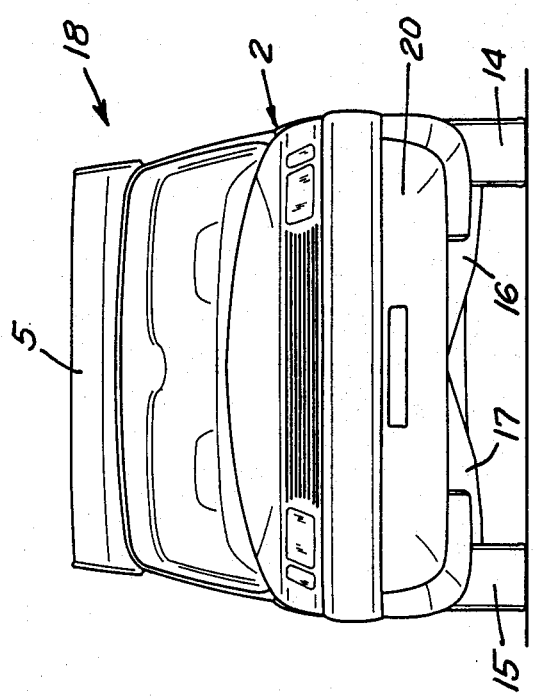
FIG. 4 is also a front view, but showing the vehicle in the automotive configuration, with wings, tail and propeller retracted, and wheels partially retracted to lower the body to a conventional height.

FIGS. 4 and 5 show the automobile configuration 18 of the fixed wing aircraft 1, in which the telescopic wings 3,4 are retracted into the wing middle box 5 that is integral with the roof of the fuselage body. The telescopic V-tail stabilizer 7, 8 is retracted into the fuselage 2 and is stored in compartment 19 (see FIG. 6). The propeller 6 and pylon 9 are folded down into the fuselage, and the wheels 10, 11, 14 and 15 are partially retracted into the fuselage to the typical height for road operation. The fuselage body 2 has energy absorption structures 20 and 21 at the front and rear ends thereof, which serve as front and rear automobile bumpers.

In FIGS. 5 and 6, other typical automobile elements and their possible locations are schematically shown, as, for instance, engine 23, control wheel 24, automotive instrument panel 25, aircraft instrument panel 26, gear shift lever 27, handbrake 28, seats 29, 30, fuel tank 31, engine radiator 32, front lights 33, rear lights 34, trunk compartment 35, gear box 36 containing the transfer gears for selectively driving either the rear wheels or propeller shaft and also including the differential gears for the rear wheels, and spare wheel 37.

The vehicle has one engine 23 at the front end, which is used for both road and in-flight operation. During road operation, the rear wheels 10, 11 are driven in a conventional manner, although a front wheel drive could also be used in an alternative arrangement. In FIG. 6 the rear wheel drive is shown. During flight operation, the propeller 6 is driven by the drive shaft system consisting of elements 38, 39 and 40, as schematically shown in FIG. 6. Power transmission to the rear wheels or to the propeller shaft is controlled by a shift lever 22.

Figure 7:
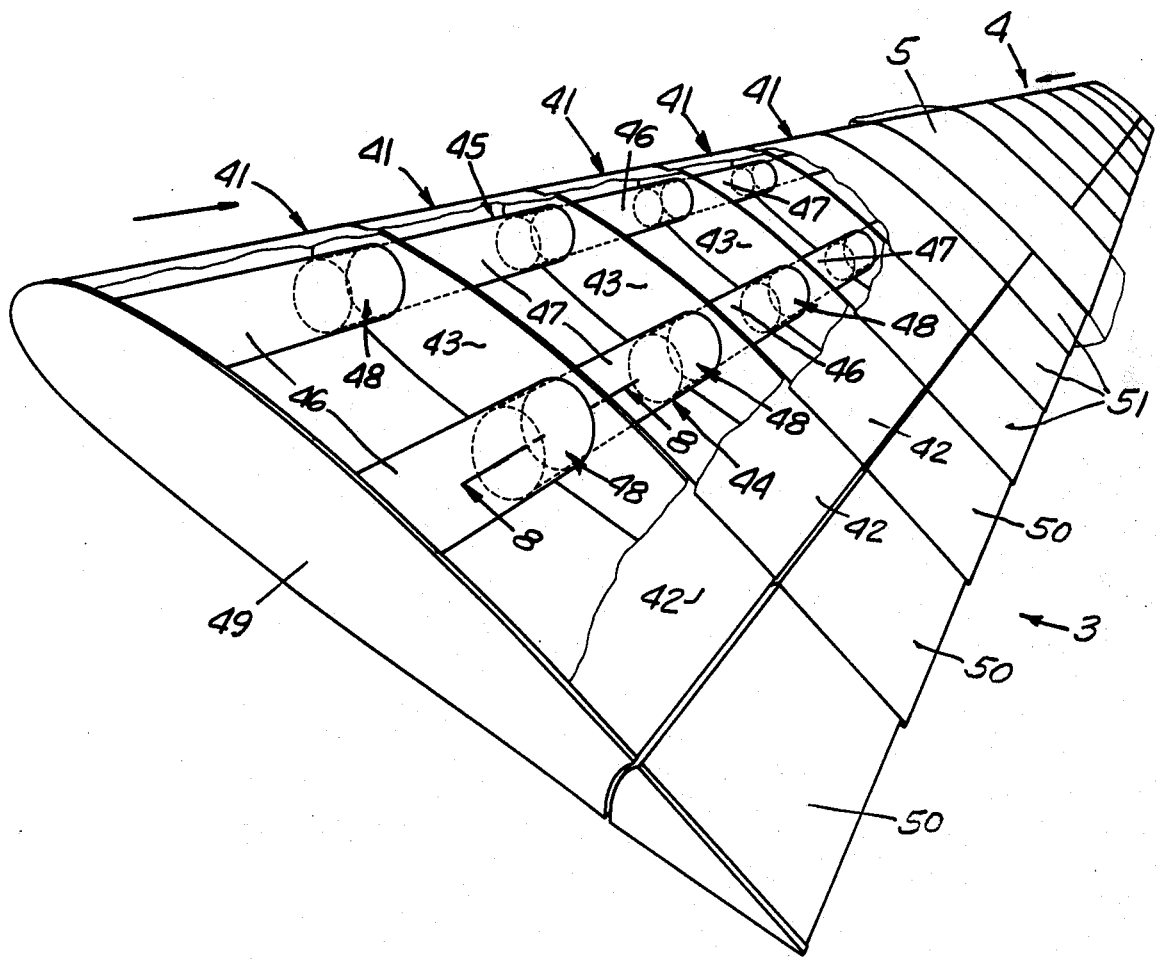
FIG. 7 is a partially cut-away schematic perspective view of the telescopic wing, showing some of the internal details.
Figure 8:
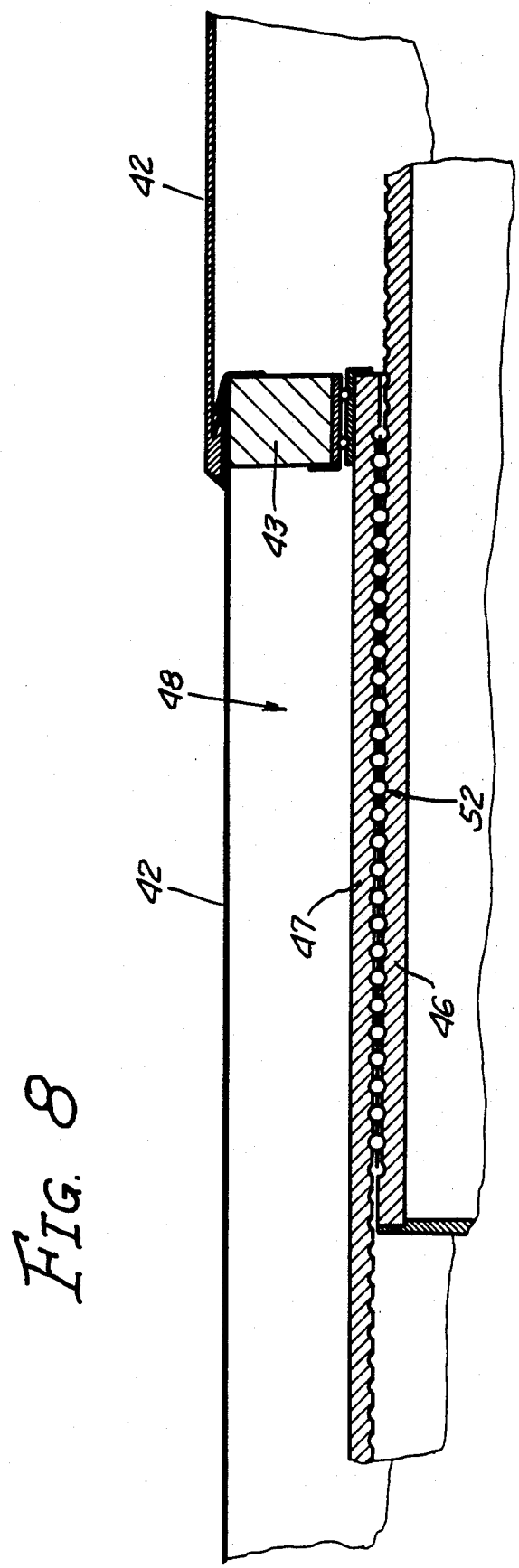
FIG. 8 is an enlarged fragmentary section taken at 8—8 in FIG. 7.
Figure 9:
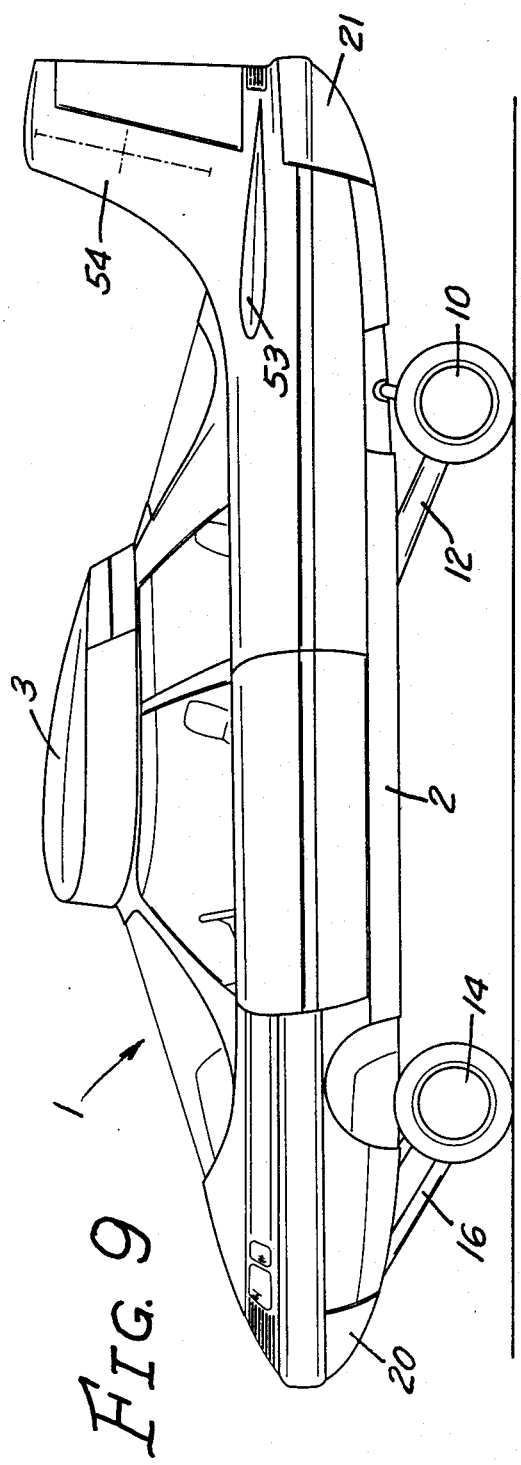
FIG. 9 is a side elevation of another embodiment of the invention, shown in the aircraft configuration, and differing from the first embodiment in that there are two laterally spaced vertical stabilizers connected at their top ends by a horizontal airfoil, which forms a shroud surrounding two side-by-side pusher propellers, and laterally extending horizontal stabilizers.
Figure 10:
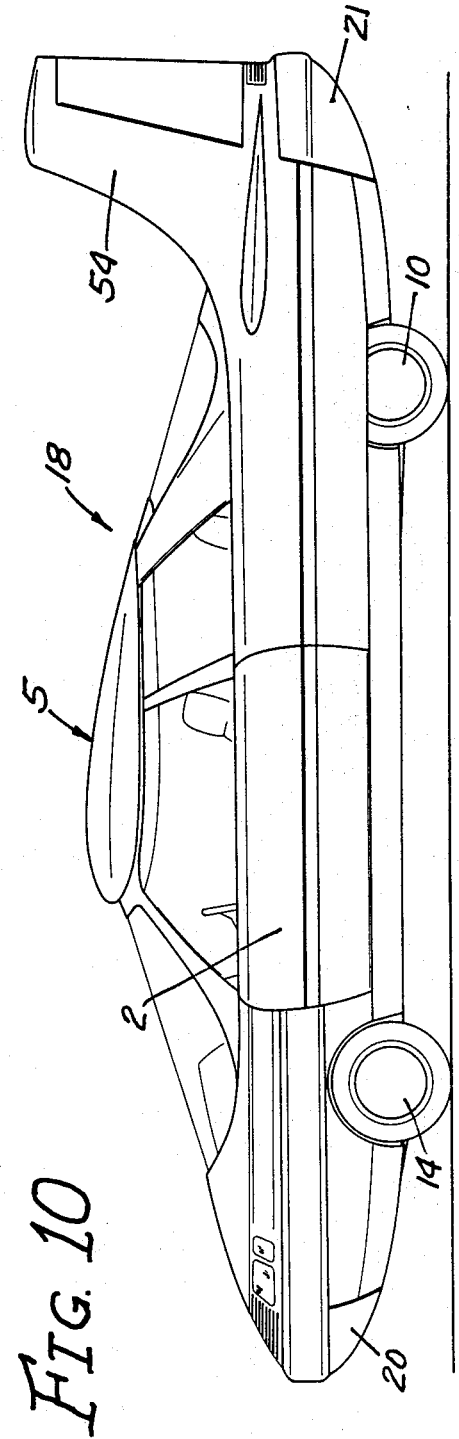
FIG. 10 is a side elevation of the embodiment of FIG. 9, shown in the automotive configuration.
Figure 11:
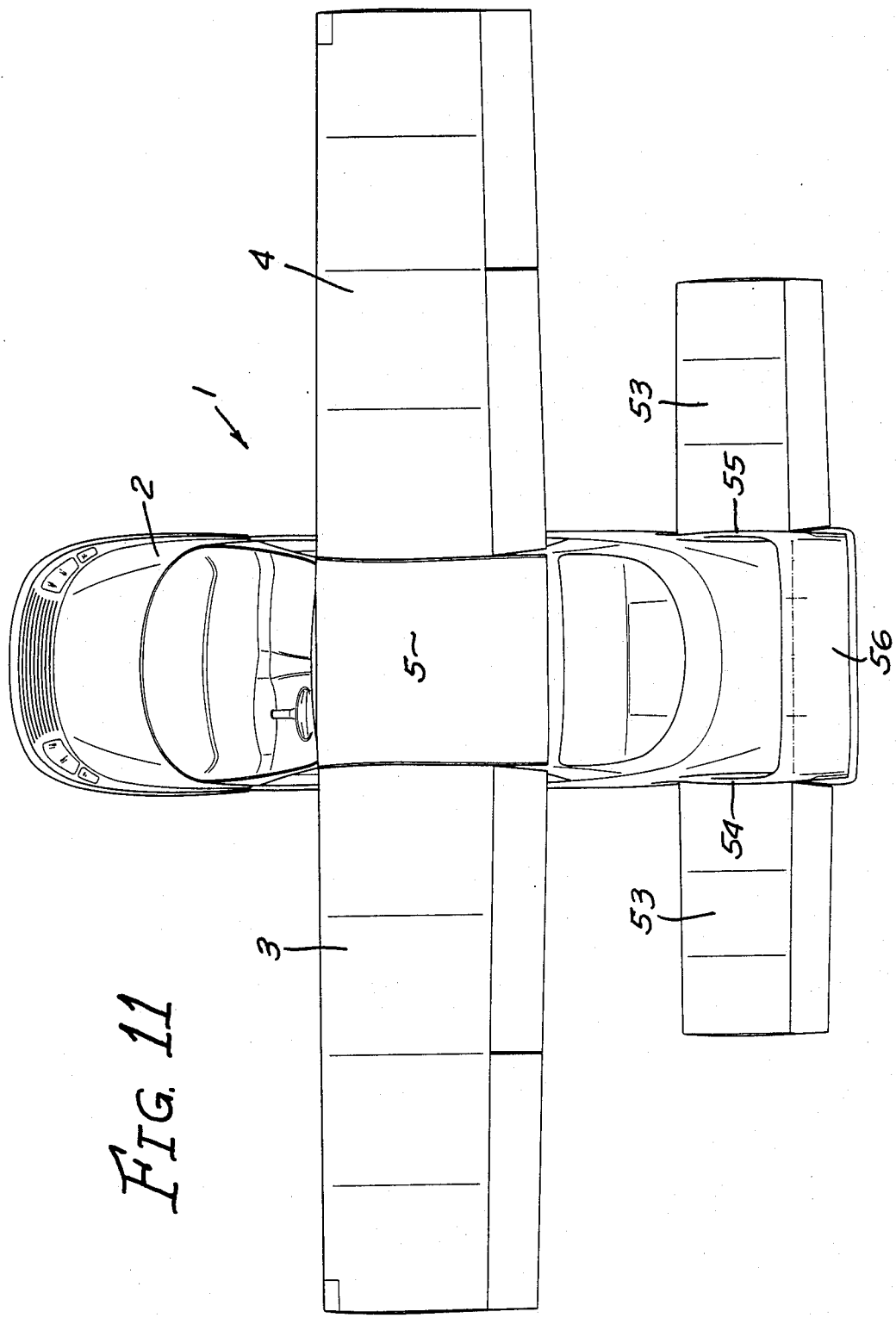
FIG. 11 is a top plan view of the aircraft configuration shown in FIG. 9.

FIGS. 7 and 8 show the telescopic wings 3, 4 in more-or-less schematic form, and this construction is illustrated and described in full detail in my copending application Ser. No. 090545, filed Aug. 27, 1987, to which reference may be had.

In FIG. 7, the telescopic wing is extended from opposite sides of the middle box 5, and consists of a plurality of short wing sections 41, each comprising skin sections 42 attached to ribs 43, and carried by a tubular rear spar 44 and tubular front spar 45. Each of the spars 44, 45 is subdivided into non-rotatable spar sections 46 and rotatable spar sections 47, the rotatable and non-rotatable spar sections being disposed in alternating disposition so that each non-rotatable spar section is joined at opposite ends to two rotatable spar sections. The rotatable and non-rotatable spar sections overlap one another at 48, and are adapted to telescope with respect to one another when the wing is retracted, as will be described presently. The skin sections 42 also overlap and are slidable over one another. At the tip end of the outer wing section is an end plate 49, which closes the outer wing section. The trailing edge of each wing half is formed by telescoping aileron sections 50 and flap sections 51.

The basic principle of the telescopic wing is that the spars 44, 45 are extended or retracted by rotating the rotatable sections 47 while preventing rotation of the other spar sections 46. Each of the rotatable spar sections 47 extends, at one end, into the adjoining non-rotatable spar section 46, while the other end of the rotatable spar section extends over the adjoining non-rotatable spar section. In FIG. 8, one end of rotatable spar section 47 is shown extending over the adjoining end of non-rotatable spar section 46. The two overlapping spar sections are rotatably interconnected by a rolling element bushing 52, consisting of a plurality of ball bearings or equivalent running in spiral or helical channels formed in the opposed cylindrical surfaces. These channels serves as races for the balls, and are the equivalent of screw threads. The channels at one end of the rotatable spar section 47 and its overlapping end of non-rotatable spar section 46 are right-hand in direction, while the channels at the other end are left-hand in direction. To extend or retract the wings, the rotatable spar sections 47 are driven in one direction or the other by means, not shown.

Figure 2:
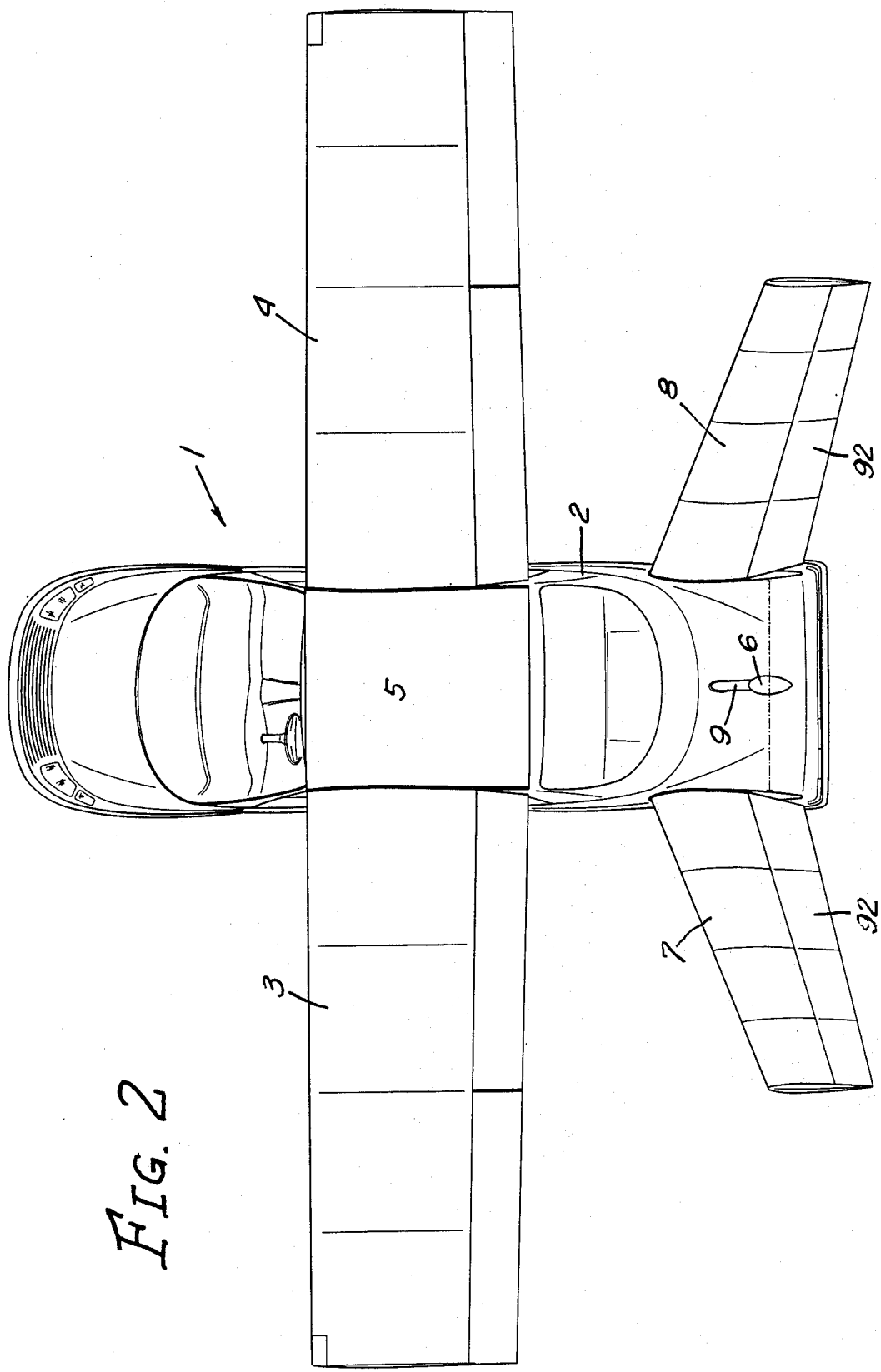
FIG. 2 is a top plan view of the same.
Figure 3:
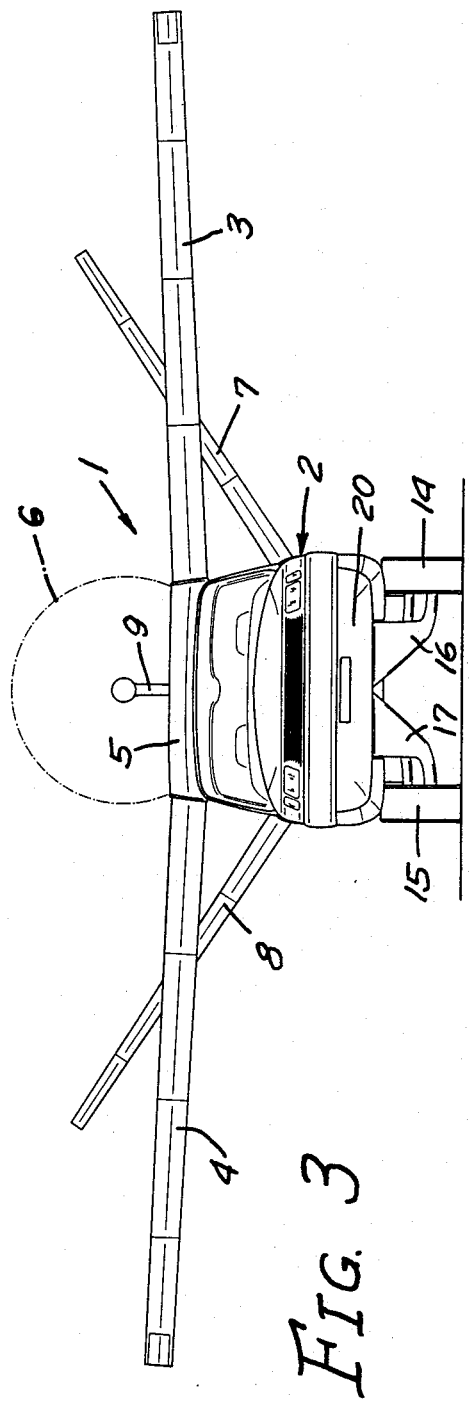
FIG. 3 is a front view of the same.

FIGS. 9, 10, 11, 12, 13 and 14 show another embodiment of the invention which is essentially the same as the preceding embodiment, but differs therefrom in that the V-tail arrangement of FIGS. 1-3 has been replaced by horizontal stabilizers 53 that can be telescopically retracted into the rear end of the fuselage, and two laterally spaced vertical stabilizers 54 and 55 that are connected at their top ends by a horizontal airfoil 56. Mounted on the rear end of the fuselage 2 between the vertical stabilizers 54, 55 are two pylons 9' carrying propellers 6'. The pylons 9' and their propellers 6' as well as the vertical stabilizers 54, 55 and horizontal airfoil 56, may be fixed in place, or the pylons and propellers may be completely retracted and the vertical stabilizers 54, 55 partially retracted. The vertical stabilizers together with horizontal airfoil 56 provide a cowl surrounding the propeller to provide some protection for the same in extended position.

FIGS. 15, 16 and 17 show still another embodiment of the invention, which is basically similar to the other embodiments, but has a different tail structure, including two vertical stabilizers 58, 59, horizontal stabilizers 60, and a single propeller 6 carried by a pylon 9. The vertical stabilizers 58, 59 are telescopically retracted into the short stub fins 61 and 62 projecting upwardly from the fuselage at the rear end thereof, the said fins serving as storage compartments for the vertical stabilizers. Among the advantages inherent in this embodiment are the greater directional stability that conventional horizontal and vertical stabilizers provide, together with the greater efficiency of a single, large diameter propeller, and the reduced drag and good directional control that results from locating the vertical stabilizers outside the propeller wash. By using two vertical stabilizers instead of just one, it is possible to use shorter stabilizers, which are more readily telescoped into the restricted compartment space provided by the fins 61, 62.

One important advantage of the invention is in the means for controlling the attitude of the aircraft during takeoff. The problem is created by the fact that the center of gravity lies approximately midway between the front and rear wheels, which are spaced far apart for automotive stability. At the same time, the horizontal stabilizers with attached elevators are located closely adjacent the rear wheels due to the compact fuselage, and this results in a relatively short moment arm between the rear wheels and the horizontal stabilizer. Due to the short arm, it is not possible to create enough moment with the horizontal stabilizer to tilt the aircraft fuselage up to the necessary angle of attack for lift-off. Thus, the conventional approach used by current aircraft design for takeoff cannot be employed.

With the present invention, the problem is solved by providing means whereby a rearward pull on the control wheel to actuate the elevators for lift-off causes the rear wheels to be partially retracted so that the front end of the fuselage is tilted upwardly, placing the wings at a high angle of attack. This is also reversible, which means that the rear wheels will be extended again if the control wheel is pushed forwardly back to the original position.

Figure 18:
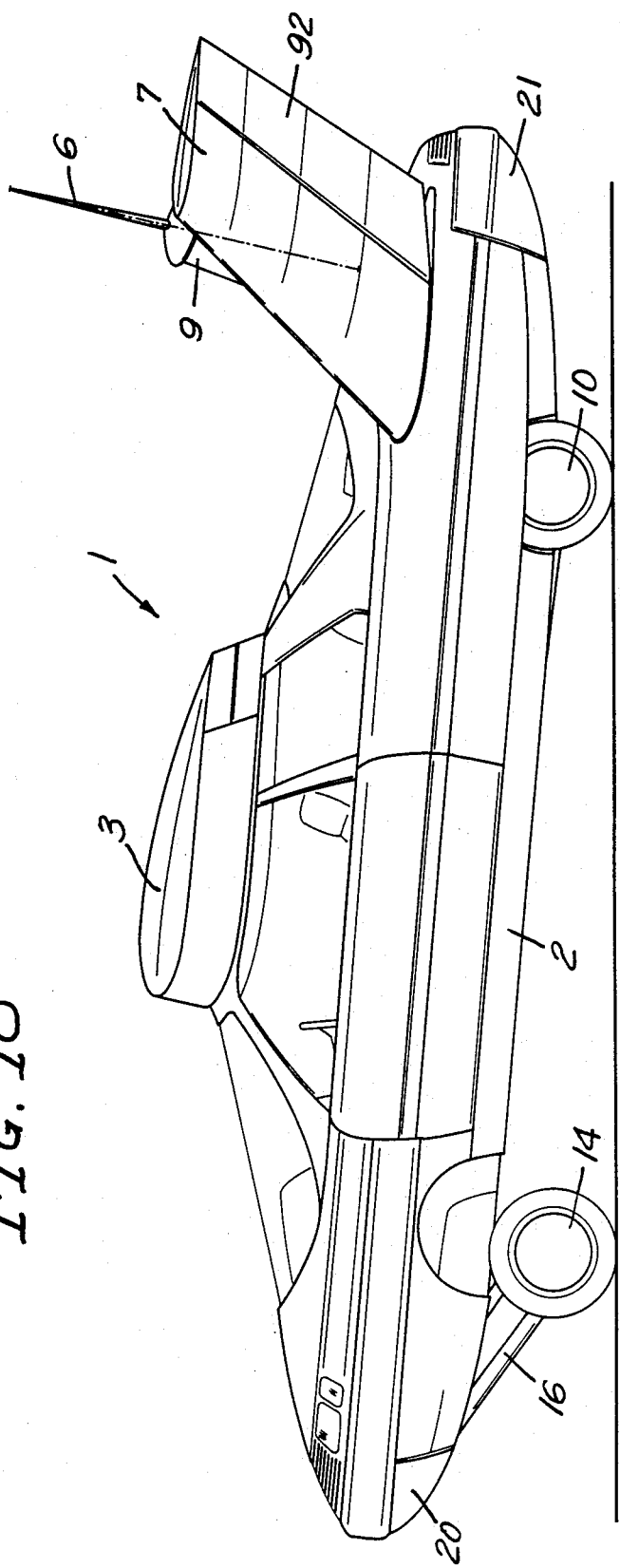
FIG. 18 is a side elevation of the embodiment in FIGS. 1-3 in aircraft configuration, showing how the rear wheels partially retract as the elevators are raised, tilting the body to an appropriate angle of attack for liftoff.

FIG. 18 shows the fixed wing aircraft during the take-off run shortly before lifting off the ground. The rear wheels 10 and 11 have been partially retracted by pulling the control wheel rearwardly, and the aircraft is now in the high-angle-of-attack for take-off. When the rear wheels are partially retracted for lift-off, the front wheels 14, 15 remain fully extended.

Figure 19:
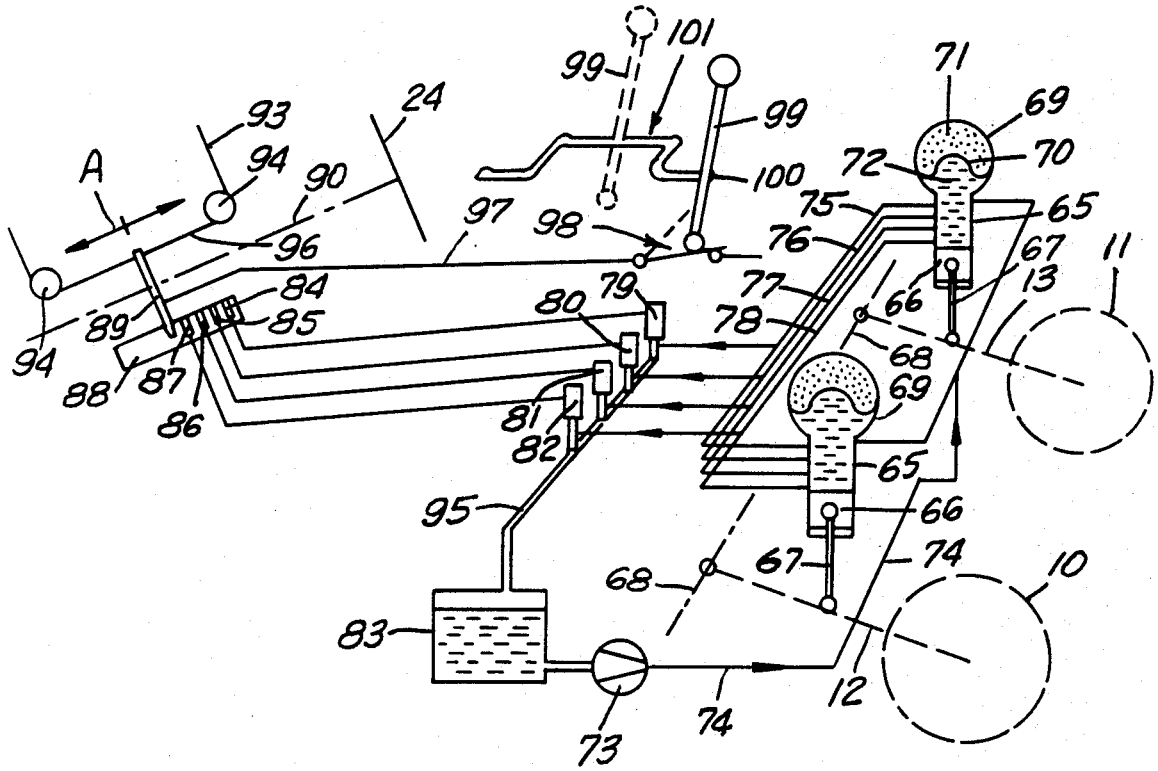
FIG. 19 is a schematic drawing of the electro-hydraulic-pneumatic system for controlling the height of the rear wheels during takeoff.

This unique method of placing the aircraft in the high-angle-of-attack attitude for lift-off is accomplished with a mechanism shown schematically in FIG. 19. The rear wheels 10, 11 are extended and retracted by pneumatic-hydraulic cylinders 65, having pistons 66 with piston rods 67 that are connected to the wheel suspension arms 12, 13. The wheel arms 12, 13 are swung upwardly or downwardly about a transverse axis 68. Cylinders 65 have spherical chambers 69 at their head ends, and dividing the chambers into upper and lower portions are diaphragms 70. The upper portion of the chambers is filled with high pressure gas 71, while the lower portion of the chambers and the length of the cylinders 65 above pistons 66 is filled with hydraulic fluid 72.

Hydraulic fluid under pressure is supplied to the cylinders 65 by a pump 73 through lines 74. Opening into the cylinders 65 at approximately equidistantly spaced intervals along the cylinder axes are outlet lines 75, 76, 77 and 78, which are connected between the cylinders. Line 75 is connected to both cylinders at the highest level, and this line is connected to a solenoid valve 79. Solenoid valve 79 is a normally closed valve which, when actuated, opens and discharges fluid into return line 95 that empties into a reservoir 83. Line 76 opens into both cylinders 65 at the next lower level, and this line is connected to normally closed solenoid valve 80, which also discharges into return line 95. Lines 77 and 78 also open into cylinders 65 at lower levels, and are connected respectively to normally closed solenoid valves 81 and 82.

Solenoid valves 79, 80, 81 and 82 are electrically connected by wires to contacts 84, 85, 86 and 87, respectively, mounted on a block 88. The contacts are successively contacted by a wiper 89 which is connected to the control wheel shaft, represented by the axis line 90, and moves therewith as control wheel 24 is pulled rearwardly or pushed forwardly by the pilot to actuate the elevators 92. Elevators 92 are attached to and form a part of the horizontal stabilizers 53 or 60, or V-tail 7, 8, and are actuated by cables 93 passing around pulleys 94 to form a short section 96 extending parallel to wheel axis 90. Wiper 89 or its supporting structure is attached to section 96 of cable 93 so that when the control wheel is pulled or pushed along axis 90, cable 93 is moved with it in one direction or the other, as indicated by arrows A.

Wiper 89 is electrically connected by wire 97 to a normally open switch 98, which is closed only when a wheel-height-adjustment selector lever 99 is moved to the take-off position 100 at one end of a lever slot 101. There may be other wheel height adjustment positions for all four wheels along slot 101, using conventional automotive practice (not shown) including the fully retracted position for flight.

The height of the piston 66 within cylinder 65 is determined by which outlet line 75, 76, 77 or 78 is connected to an open solenoid valve 79, 80, 81 or 82. The line with the open valve allows hydraulic fluid to escape from the cylinder as fast as it is admitted through line 74; thus, the piston can be pushed no further down by the hydraulic pressure. Which solenoid valve is open is determined by how far back the control wheel 24 is pulled, and which contact 84, 85, 86 or 87 is contacted by the wiper 89.

Prior to take-off, the pilot places the lever 99 in the take-off position 100, which closes switch 98. The airplane is then accelerated down the runway until it reaches take-off speed, during which time the control wheel 24 is held in the forward neutral position, and all four wheels are equally extended to the maximum position. As the airplane reaches take-off speed, the pilot pulls back on the control wheel 24 to activate elevators 92, and at the same time wiper 89 is caused to touch one or another of the contacts 87, 86, 85 or 84, depending upon how far back wheel 24 is pulled. If, for example, the wiper 89 stops on contact 85, solenoid 80 will be activated, opening the valve for outlet line 76, causing pistons 66 to rise in cylinders 65 until they reach the outlet position for line 76. This upward movement of the pistons 66 and piston rods 67 causes the suspension arms 12, 13 to swing upwardly, raising the wheels 10, 11 to the partially retracted position corresponding to the outlet position for line 76. With the rear wheels 10, 11 thus partially retracted, the airplane is placed in the high-angle-of-attack position shown in FIG. 18, and thus lifts off the ground.

Figure 20:
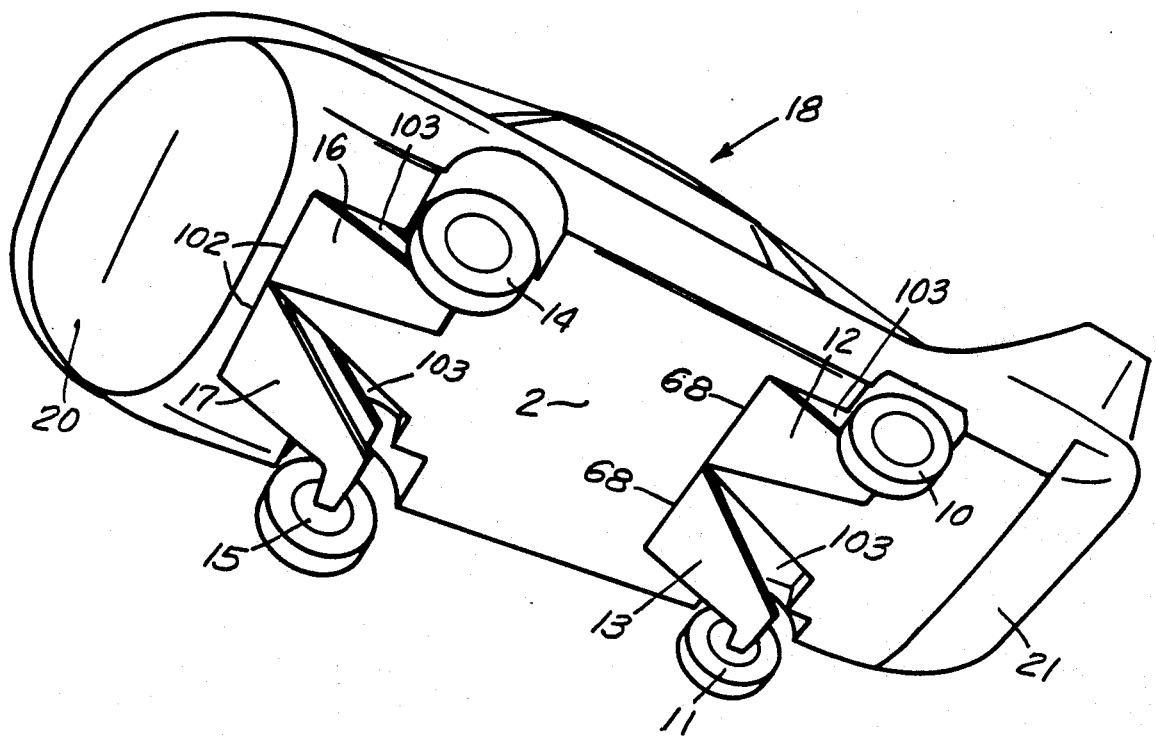
FIG. 20 is a perspective view of the underside of the vehicle body, showing the wheel suspension system.

FIG. 20 is a perspective drawing of the underside of the aircraft in the automotive configuration 18, showing all four wheels 10, 11, 14 and 15 extended. As described earlier, rear wheels 10, 11 are carried by suspension arms 12, 13, respectively, and front wheels 14, 15 are carried by arms 16, 17. The suspension arms are generally triangular in shape, the rear wheel arms being swingable about transverse axis 68, while the front wheel arms are swingable about axis 102. The pivot axes 68, 102 are located a substantial distance ahead of the wheel axes, thereby providing a long arm for maximum vertical travel of the wheels, so as to allow for maximum energy absorption upon landing.

The triangular suspension arms 12, 13, 16, 17 have flat surfaces on their bottom sides which, when said wheels are extended, project downwardly and rearwardly from their respective hinge axes at an angle such that upon emergency landing upon water, said flat surfaces serve as inclined planing surfaces creating hydrodynamic lift to carry a portion of the aircraft weight. The triangular configuration of the flat surfaces results in a small area of inclined planing surface hitting the water at the initial contact, and then as the aircraft sinks lower in the water, the increasingly larger planing surfaces become effective, so as to gradually lower the airplane into the water. During normal landing on a runway, the downwardly and rearwardly inclined flat surfaces create additional drag to help slow the aircraft. In the event of an emergency landing on rocky or extremely rough terrain, the inclined flat surfaces provide a planing effect which enables the aircraft to slide over obstacles. In flight, the suspension arms are retracted into compartments 103 formed in the underside of the fuselage 2, and the flat surfaces on the arms serve as fairings covering the compartments and providing a smooth underbody surface.

Figure 21:
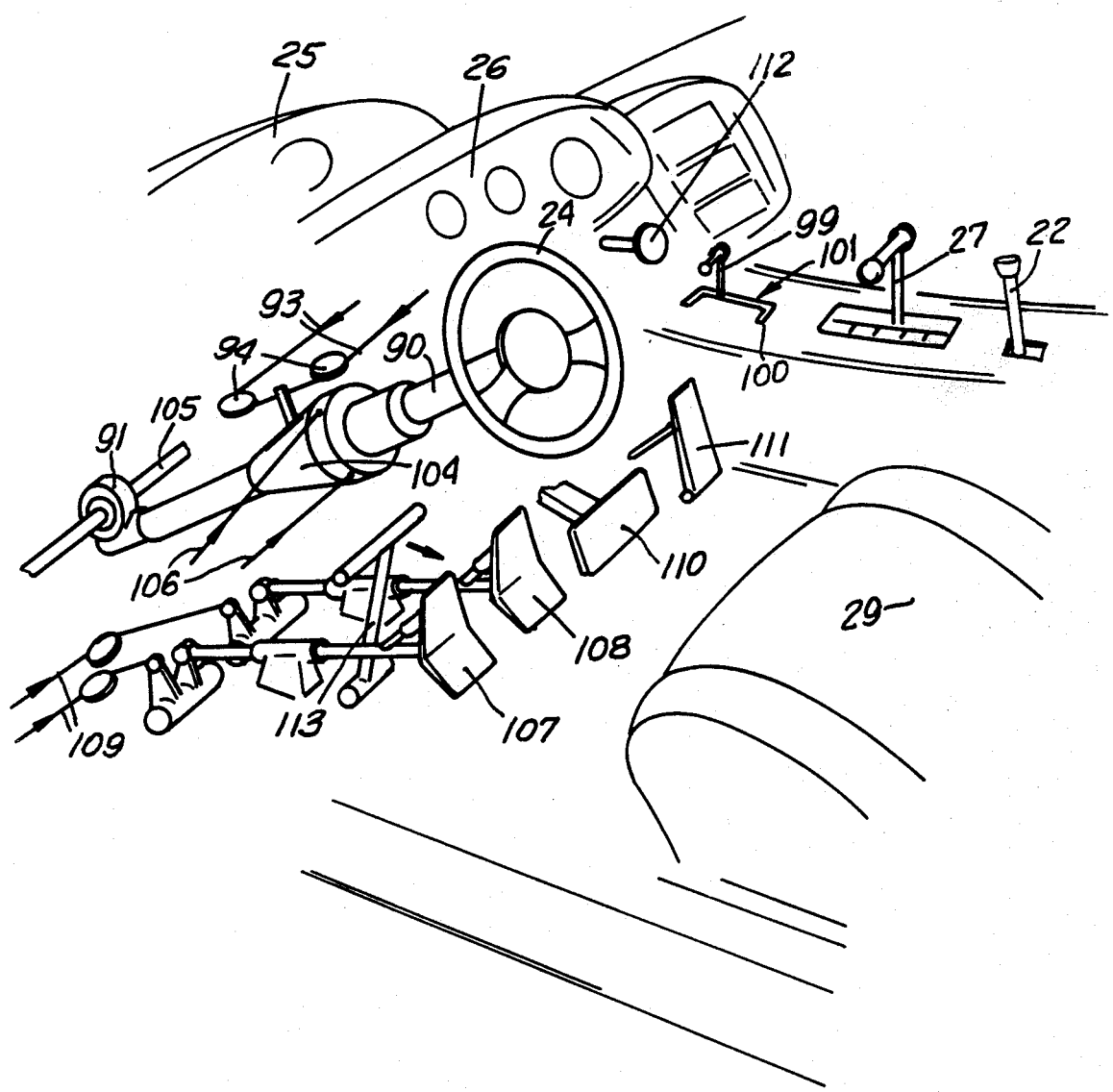
FIG. 21 is a fragmentary perspective view of the interior of the body, showing the combined control systems for both aircraft and automotive configurations.

FIG. 21 shows the placement of the most important control elements for both automotive and aircraft configurations. The control wheel 24 is connected by a multi-function control unit 104 (which will be described presently) to the front wheel steering shaft 105 through a gear box 91, and to aileron control cables 106 as well as elevator control cables 93. Through this arrangement, the control wheel 24 is permanently connected to the steering elements for both the automotive and aircraft configurations, which increases the security of the system, besides reducing confusion and handling complexity for the driver/pilot.

Rudder pedals 107 and 108 are located on the left and right sides of the control wheel shaft 90, and are connected to rudder control cables 109. To the right of the rudder pedals is a brake pedal 110 for automotive operation, and to the right of the brake pedal is an accelerator pedal 111, for automotive operation. For aircraft operation, there is a manually controlled throttle 112 located just below the instrument panel 26. Thus, the aircraft rudder pedals and throttle are conventionally located for the airplane pilot, and the automotive brake pedal and accelerator pedal are conventionally located for the automobile driver, so that there is no problem of confusion in operating these control elements in the event of a sudden emergency. Moreover, the security of the system is enhanced, since the pedals are all permanently installed, and no switching, moving, or rearrangement of these important control elements is required.

During road operation and during parking of the aircraft, the rudder pedals 107, 108 can be held in the neutral position by a spring-loaded, T-shaped lever 113 that is swingably supported for movement down to a position bearing against the back sides of the rudder pedals. This arrangement prevents unnecessary and objectionable movement of the rudder pedals due to wind or vibration. The rudder pedals can be restored to full functioning capability by merely pushing forwardly on one of the pedals, which will overcome the spring holding the lever 113 and cause the lever to pull up to the inoperative position, as shown in FIG. 21.

Lever 99 is used for height adjustment of the wheel suspension system, using the more-or-less conventional height adjusting system found on some automobile models employing systems somewhat similar to that shown in FIG. 19. When the lever 99 is at one end of slot 101, the wheels are fully retracted for flight, while other positions of the lever in the slot cause the wheels to be extended to the height positions suitable for landing and driving. With the lever 99 at the other end of slot 101, which is the take-off position 100, the wheels are fully extended, while the rear wheels are controlled by rearward movement of the wheel 24 to partially retract for lift-off, as described earlier.

Figure 22:
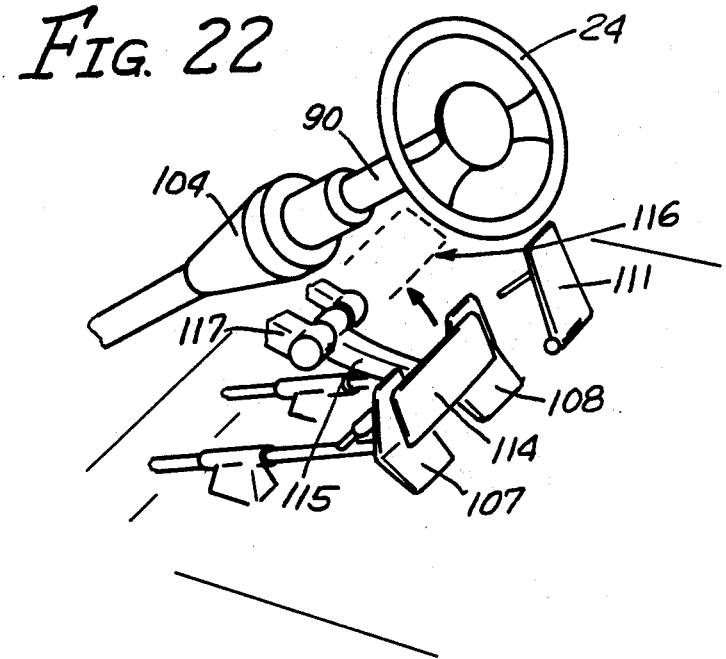
FIG. 22 is a fragmentary perspective view of another embodiment of a combined control pedal arrangement for both aircraft and automotive configurations.

An alternative pedal arrangement might be as shown in FIG. 22, wherein the automotive brake pedal 114 is pivoted for vertical swinging movement between an inoperative position 116, shown in dotted lines, to an operative position shown in solid lines. Pedal 114 is attached to a lever 115 that is pivotally supported by a brake actuating arm 117, and lever 115 is spring-loaded by a conventional over-center spring arrangement (not shown) that forces the lever to either the operative or inoperative position. When pedal 114 is down in the operative position shown in FIG. 22, there is sufficient clearance between the brake pedal 114 and rudder pedals 107, 108 to allow the brake pedal to be pushed forwardly for braking operation.

Figure 23:
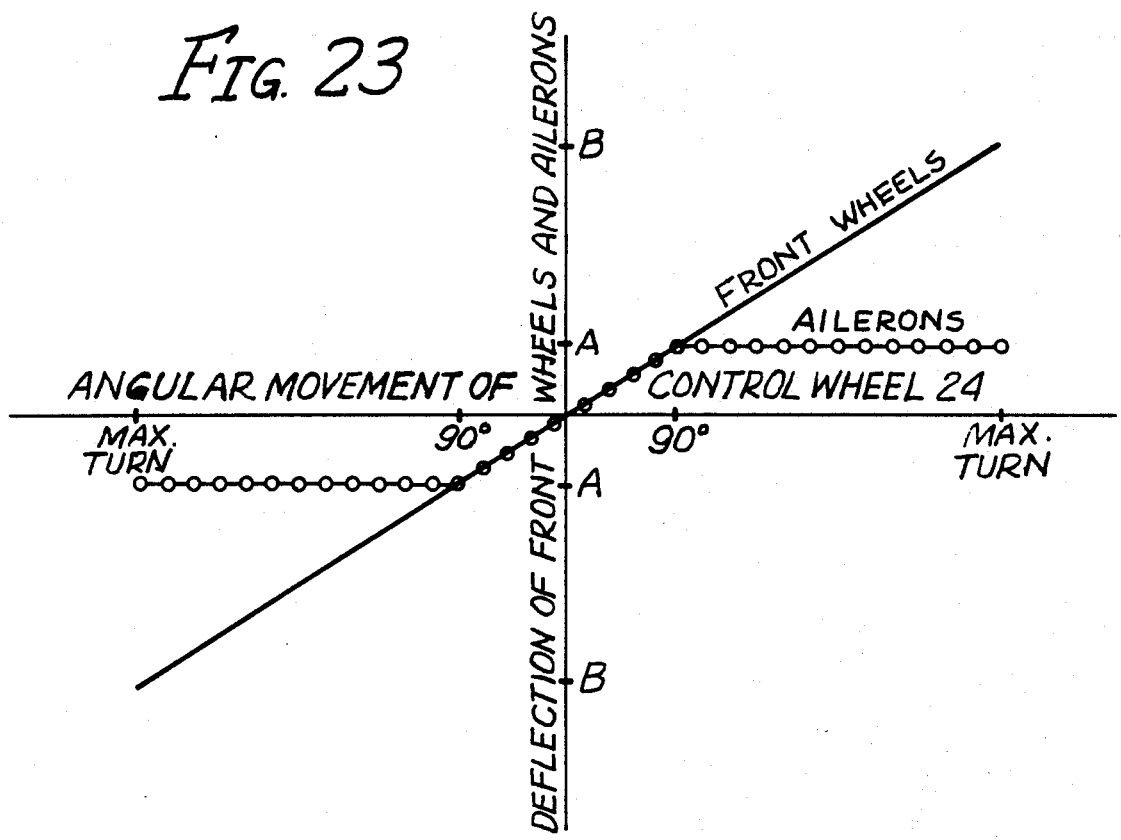
FIG. 23 is a graphical representation of the angular deflection of the ailerons and the turning angle of the front wheels as a function of the turning angle of the steering wheel.

One of the more important differences between steering an automobile and steering an aircraft is the amount of turning required of the wheel 24. In aircraft usage, full deflection of the ailerons is obtained with a 90° turn of the control wheel in either direction from the centered, neutral position. In automotive usage, the steering wheel 24 must be turned from 1½ to 2 full turns to either side of the neutral centered position to turn the front wheels to the maximum angular deflection. To retain these conventional steering characteristics both for aircraft and automotive usage, the present invention includes a mechanism 104 which combines the functions of both, as illustrated in FIG. 23. FIG. 23 is a diagram showing the deflection of ailerons and rear wheels as a function of the control wheel angular movement. During the first 90° turn of control wheel 24, both ailerons and front wheels turn simultaneously. At the 90° point in turning the control wheel, the ailerons are deflected to the maximum extent, while the front wheels have been turned only 4–6 degrees. Continued turning of the control wheel 24 produces no further deflection of the ailerons, but continues turning the front wheels until they reach maximum deflection at approximately 1½ to 2 full turns of the control wheel. Point A on the Y axis of the diagram represents maximum deflection of the ailerons, while point B represents maximum deflection of the front wheels.

FIG. 24 is a cross section through the mechanism 104, showing how the above-described function is obtained. Steering wheel 24 is fixedly connected to one end of the steering column 90 by splines 118, and at its other end the steering column is connected by splines 119 and 120 to a tubular portion 121 forming part of a universal joint 122. Universal joint 122 drives a shaft 123 which goes to a gear box 91 on the front wheel steering shaft 105 (FIG. 21 Splines 119, 120 allow the steering column 90 to slide lengthwise relative to member 121, while rotation of the column is transmitted to the member 121. Universal joint member 121 is rotatably supported on the conical end housing 124 by a bearing 125. Steering column 90 is connected by linear bearings 127, 128 and rotational bearings 129, 130, and by end plate 131 to the cylindrical housing 132. Linear bearings 127, 128 allow the steering column 90 to move linearly with respect to the housing 132, while rotational bearings 129, 130 allow the steering column to turn relative to the housing. Cylindrical housing 132 is attached to the body structure of the vehicle by flanges 133.

Formed on the outer surfaces of the steering column 90 are length-wise-extending splines 134 which mesh with internal splines 135 in the end of a cylindrical member 136 that surrounds the steering column and extends for a substantial portion of the length of the steering column, e.g., slightly more than one-third of its length within housing 132. Splines 134, 135 allow the steering column 90 to slide freely through the cylindrical member 136, and also cause the member 136 to rotate with the steering column.

Fixedly attached to the outside of cylindrical member 136 is a bearing 137 having a plurality of recirculating balls 138 that run in spiral grooves 139 formed in the inside surface of cylindrical housing 132. The spiral grooves 139 thus serve as the outer race for ball bearings 138, and cause cylindrical member 136 to move linearly when it is rotated with the steering column 90.

Figure 25:
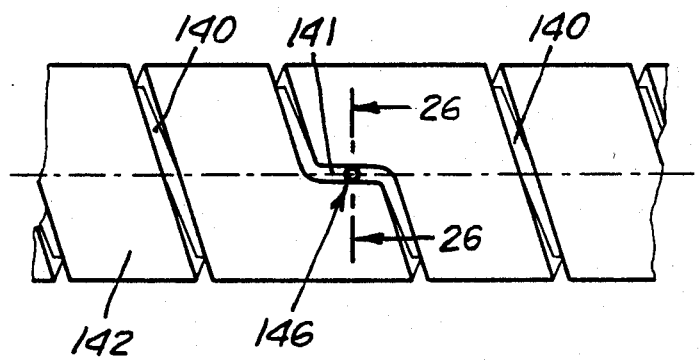
FIG. 25 is an enlarged fragmentary sectional view taken 25—25 in FIG. 24.

Surrounding steering column 90 and extending into the cylindrical housing 132 is a tubular sleeve 142 having a drum 143 at its left-hand end, around which aileron control cables 106 are wrapped. Sleeve 142 is rotatably supported on housing 132 by a ball bearing 145, and its right-hand end extends into the open end of cylindrical member 136. Formed in the outer surface of tubular sleeve 142 is a spiral groove 140 and a short linear groove 141. Projecting radially inwardly from the open left-hand end of cylindrical member 136 is a pin 146 which extends down into and is slidable along the length of grooves 140, 141, as shown in FIGS. 24 and 25, when member 136 is turning. Linear groove 141 is parallel to the steering wheel axis, while groove 140 is a spiral of the same direction and pitch as groove 139. The linear groove 141 is positioned at the midpoint of sprial groove 140, so that it divides the latter into left-hand and right-hand portions. The transition from linear groove 141 to spiral groove halves is smoothly rounded. In FIGS. 24 and 25, pin 146 is shown in the middle of the linear groove 141, which would correspond to the neutral centered position of the steering wheel 24.

The operation of the control units 104 is as follows: When the control wheel 24 (designated by dot-dash lines in FIG. 24) is turned to the right, steering column 90 and cylindrical member 136 are also turned with it, causing pin 146 to bear against the side wall of linear groove 141. Pressure of the pin 146 against the side of groove 141 causes the tubular sleeve 142 to turn with cylindrical member 136, and as this occurs, ball bearings 138 running in helical groove 139 advance the member 136 linearly to the left until pin 146 reaches the entrance to the left-hand portion of groove 140. This linear movement of pin 146 from the midpoint of groove 141 to the entrance of the left-hand portion of groove 140 occurs while the wheel 24 is being turned approximately 90° from the centered neutral position, and during this period the drum 143 and cables 106 move the ailerons to their maximum deflection. At the same time, steering column 90, acting through universal joint 122, gear box 91, and shaft 105, turns the front wheels 14, 15 approximately 4–6 degrees to the right. As the pin 146 enters the left-hand portion of helical groove 140, it moves along groove 140 without turning tubular sleeve 142, since the grooves 140 and 139 are of the same direction and pitch. Thus, the tubular sleeve 142 and drum 143 remain stationary in the fully-extended-aileron position, while the steering column 90 continues to turn an additional 1½ to 2 full turns until the front wheels 14, 15 reach their fully deflected position. The sequence of operations when the wheel 24 is turned to the left is the same as described above, except that the directions are reversed.

Figure 26:
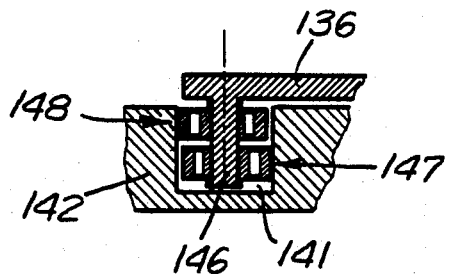
FIG. 26 is an enlarged fragmentary sectional view of a slightly modified pin and groove arrangement, corresponding to a section taken at 26—26 in FIG. 25.

To reduce friction between pin 146 and groove 140, 141, the pin can be provided with two ball-or-roller bearings 147, 148 mounted one above the other, as shown in FIG. 26, with the outer race of bearing 147 rolling against one side wall of the groove, and bearing 148 rolling against the opposite side wall. Bearings 147 and 148 are offset slightly from one another so that each bearing rolls against only one side wall. By preloading the bearings in the groove, basklash can be completely eliminated.

The steering column 90 is supported for linear movement by bearings 127 and 128, as described earlier, and this linear movement controls the elevators 92. To this end, a sleeve 149 is fixedly mounted on steering column 90, and pressed onto the outside of the sleeve is a rotational bearing 150, the outer race of which is mounted in a hub 151 that supports wiper 89, as described in connection with FIG. 19. Hub 151 also supports arm 152, which is connected to section 96 of elevator control cable 93 that extends parallel to the axis of steering column 90. By pushing or pulling on the control wheel 24, steering column 90 is moved linearly through bearings 127, 128, causing arm 152 to pull the elevator control cables 93 with it to actuate the elevators.

When the vehicle is in the automotive configuration, there is no need for the longitudinal sliding movement of the steering column 90 that controls the elevators of the aircraft, and therefore the column is locked against such sliding movement by means of a locking device 155. Locking device 155 consists of a ball bearing 156, the inner race of which is fixedly secured to the column 90, and the outer race is pressed into the hub of a wheel 157 having a tapered rim 158. A clamp 159 is movable between a disengaged position, shown in solid lines in FIG. 24, and a locking position shown in dotted lines, in which the clamp engages the tapered rim 154 to hold the column 90 against linear movement. The ball bearing 156 allows the column 90 to rotate when the steering wheel is turned. Thus, the mechanism 104 combines the functions of elevator and aileron control for aircraft usage, together with steering of the front wheels for automotive usafe, as well as height control of the rear wheels during aircraft takeoff, as described earlier in connection with FIGS. 18 and 19.

Figure 27:
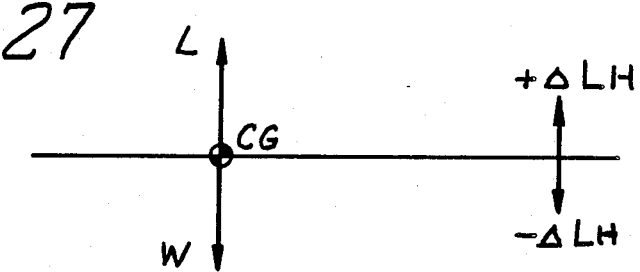
FIGS. 27, 28 and 29 are graphical representations of three different design principles showing, in FIG. 27, the condition obtained when the aerodynamic center of lift is in line with the center of gravity, and the position of the center of gravity does not change.
Figure 28:
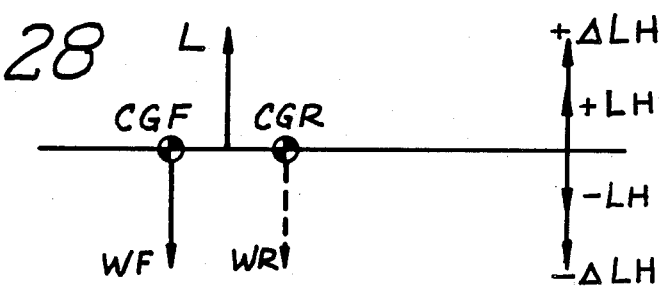
Figure 29:
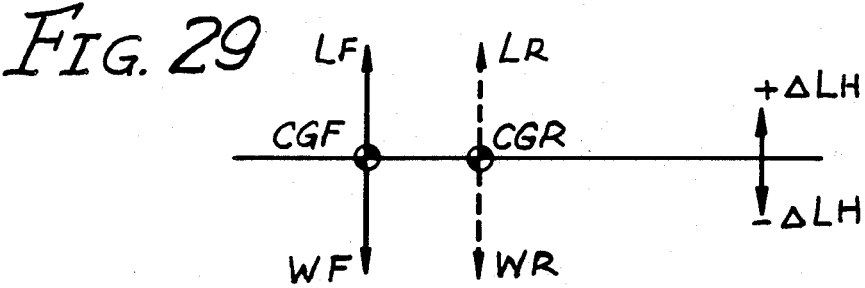

Because of the relatively short distance between the wing and horizontal stabilizers of the present invention, it is essential that provision be made to compensate for the small moment produced by the horizontal stabilizers in trimming the aircraft for different positions of the center of gravity, as well as the flight control forces necessary for landing, takeoff and speed control. FIGS. 27, 28 and 29 illustrate in general terms the relationship between the lift forces produced by the horizontal stabilizer and the position of the lift force of the wing with respect to the center of gravity, for varying positions of the center of gravity.

In FIG. 27, the center of gravity (CG) is shown directly under the center of lift (L) of the wing. The downward force of the aircraft at the center of gravity is represented by the weight (W). The upward force of the horizontal stabilizer ($+\Delta LH$) and downward lift force ($-\Delta LH$) represent the control forces necessary for takeoff and landing, and are relatively small because no trimming is required to compensate for offset of the center of gravity with respect to the lift.

In FIG. 28, the condition is illustrated wherein the center of gravity moves between an extreme forward position (CGF) and an extreme rearward position (CGR). To compensate for the moment produced by the center of gravity at the CGF position, it is necessary that the horizontal stabilizer produce a trimming force $-LH$. To compensate for the moment produced at the CGR position, the horizontal stabilizer must produce a trimming force $+LH$. These trimming forces are in addition to the normal flight control forces $+\Delta LH$ and $-\Delta LH$, and might be obtained for example by changing the angle of attack of the normally stationary horizontal stabilizer fin. This is the condition that enters into consideration in the design of all conventional aircraft.

FIG. 29 illustrates the principal of the conditions obtained in the present invention, wherein the short moment arm for the horizontal stabilizer makes it virtually impossible to obtain adequate trimming force from the horizontal stabilizer alone, owing to the relatively large moment of the center of gravity. This problem is resolved by moving the wing so that the center of lift L could coincide with the position of the center of gravity. Thus the trimming function is performed by the wing; and no trimming force is required of the horizontal stabilizer. The only function of the horizontal stabilizer is to provide the flight control forces $+\Delta LH$ and $-\Delta LH$.

Figure 30:
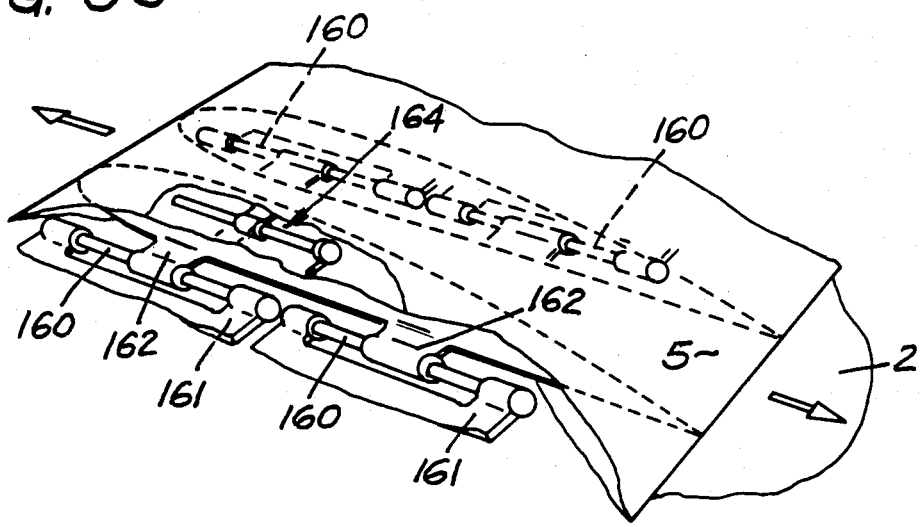
FIG. 30 is a partially cut-away, fragmentary perspective view showing the attachment of the wing to the fuselage which provides for longitudinal movement of the wing so as to trim for any shift in the center of gravity.
Figure 31:
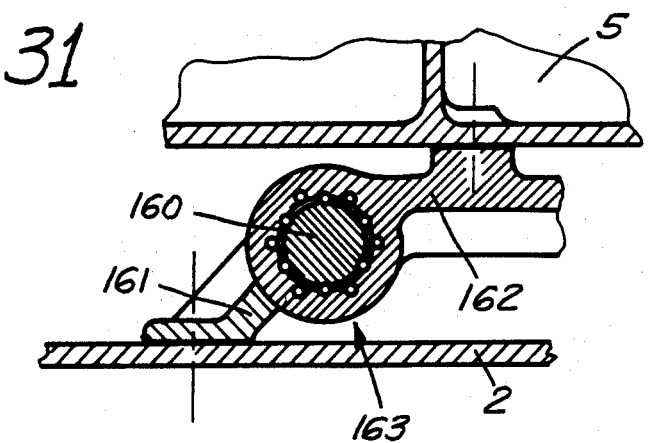
FIG. 31 is an enlarged cross-sectional view through the round shaft and low-friction bushing which connect the wing to the fuselage.

To obtain the ideal condition illustrated in FIG. 29, the wing of the present invention is mounted on the fuselage, as shown in FIG. 30, so that it can be adjusted in the fore and aft direction along the longitudinal axis of the fuselage to place the center of lift substantially directly over the center of gravity. This is accomplished by means consisting of pairs of laterally spaced, parallel, fore-and-aft-extending bars, or rails 160, which are mounted on the roof top of the fuselage 2 by attachment members 161. Attached to the underside of the middle box 5 are fittings 162 that have linear rolling element bushings 163 surrounding the bars 160, the said bushings preferably consisting of recirculating ball bearings running in longitudinally extending races, as shown in FIG. 31. The bushings 163 slide freely along the bars 160.

Figure 41:
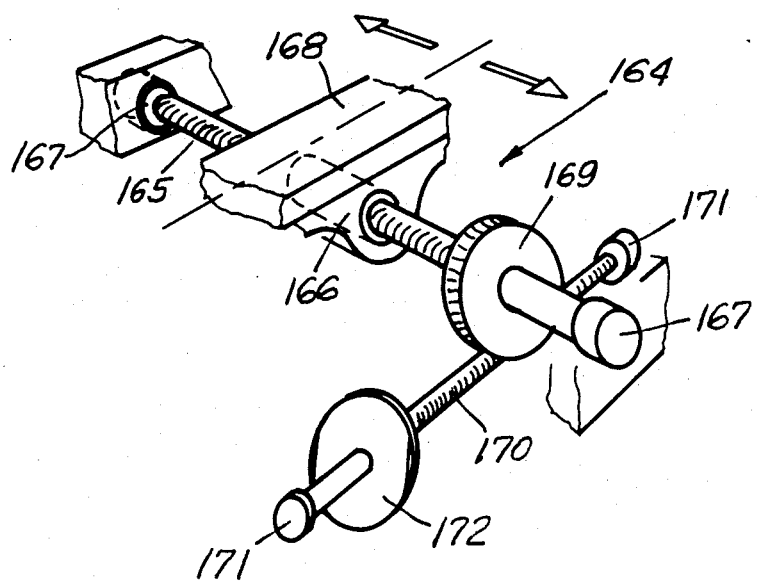
FIG. 41 is a fragmentary perspective view of the control wheel and gearing arrangement for trimming the wing.

Adjustment of the wing along the bars 160 is by means of a trim control 164, shown in FIG. 41, which includes a lead screw 165 and nut 166. The lead screw 165 is rotatably supported by bearings 167 on fuselage 2, and nut 166 is held by a block 168 that is fixed to the underside of the middle box 5. Mounted on the lead screw 165 is a worm wheel 169 that meshes with a worm screw 170 that is rotatably supported on the fuselage 2 by bearings 171. A hand wheel 172 enables the pilot to manually adjust the trim of the aircraft.

Figure 32:
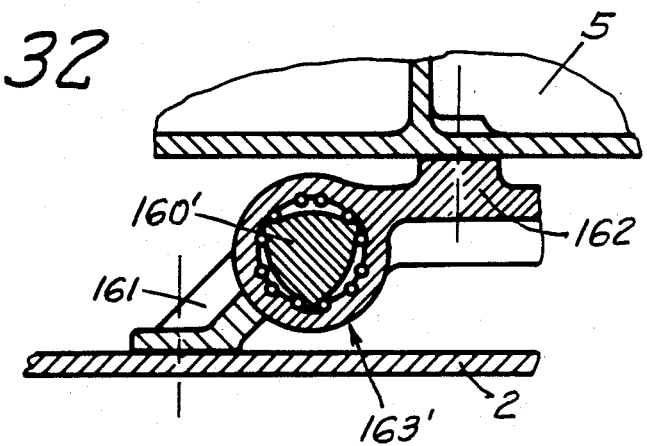
FIG. 32 is a view similar to FIG. 31, but showing another arrangement embodying a generally triangular shaft and corresponding bushing.

FIG. 32 shows an alternative bar, or rail, configuration 160', in which the cross-sectional shape of the bar is generally triangular, and the load-carrying ball bearings are grouped at the three apices. Those balls that are between the apices are being recirculated. This configuration provides somewhat greater load-carrying capability.

Figure 33:
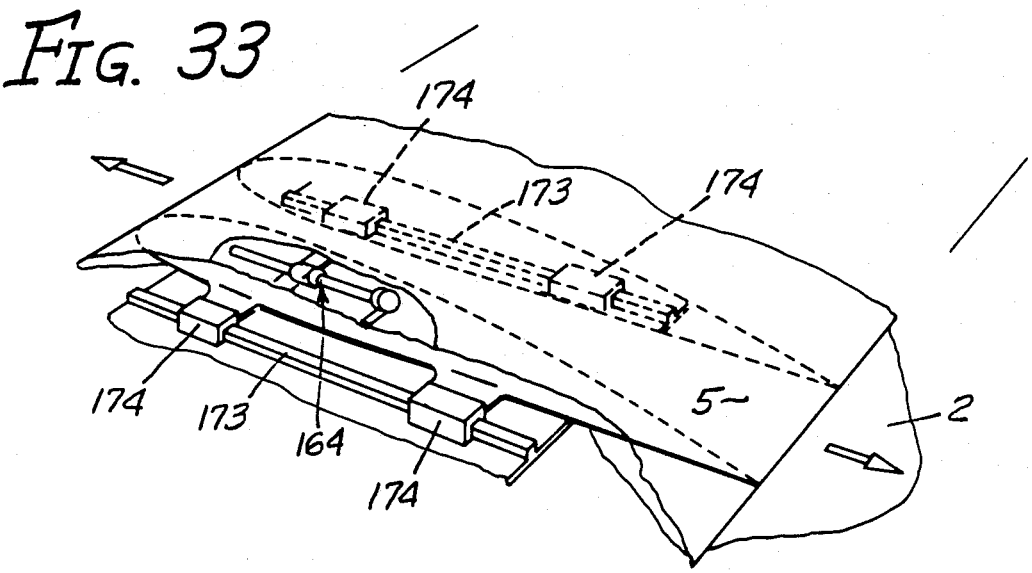
FIG. 33 is a view similar to FIG. 30, showing a modified rail and bushing arrangement.
Figure 35:
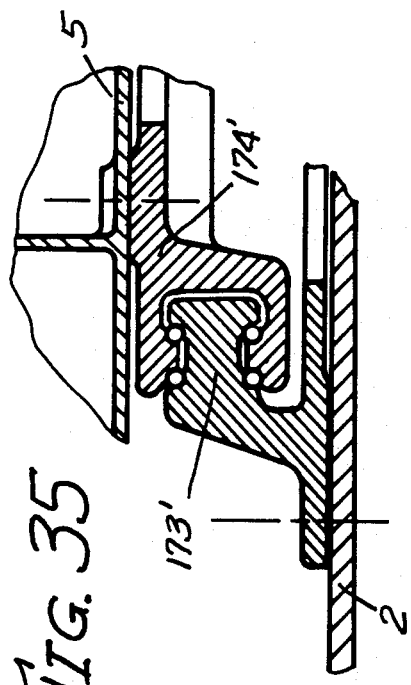
FIGS. 34, 35 and 36 are sectional views of three different rail and bushing configurations that could be used with the structure shown in FIG. 33.
Figure 34:
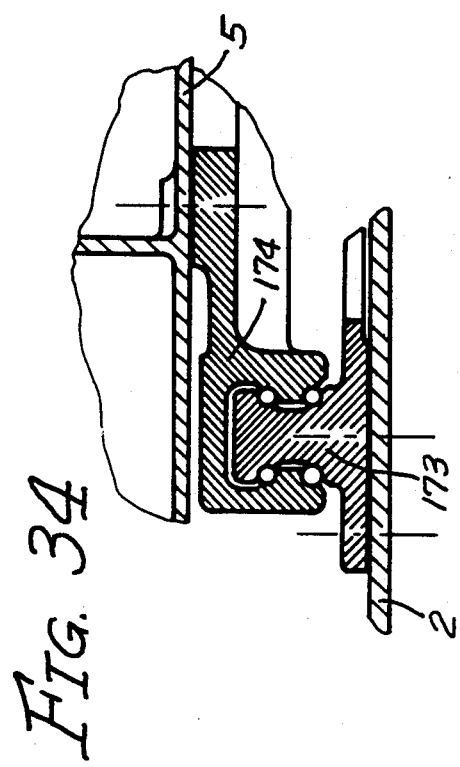
Figure 36:
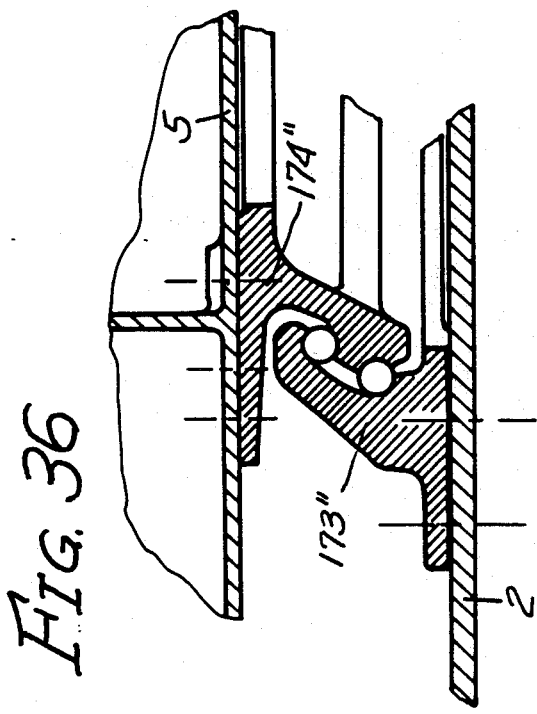

FIG. 33 illustrates another form of connection between the wing middle box 5 and fuselage 2, in which two laterally spaced parallel rails 173 are fixed to the top surface of the fuselage 2, and are engaged by shoes 174 fixed to the underside of the middle box 5. Rails 173 and shoes 174 may take the forms shown in FIGS. 34, 35 or 36. In FIG. 34, the rail 173 is oriented vertically, with ball bearings disposed between the sides of the rails and the inner sides of the shoe. In FIG. 35, rail 173' is oriented horizontally, with ball bearings disposed between the top and bottom surfaces of the rail and the opposed surfaces of the shoe 174'. In FIG. 36, the rail 173" is inclined vertically, and shoe 174" rides on just two sets of ball bearings, which contact only one side of rail 174".

Figure 37:
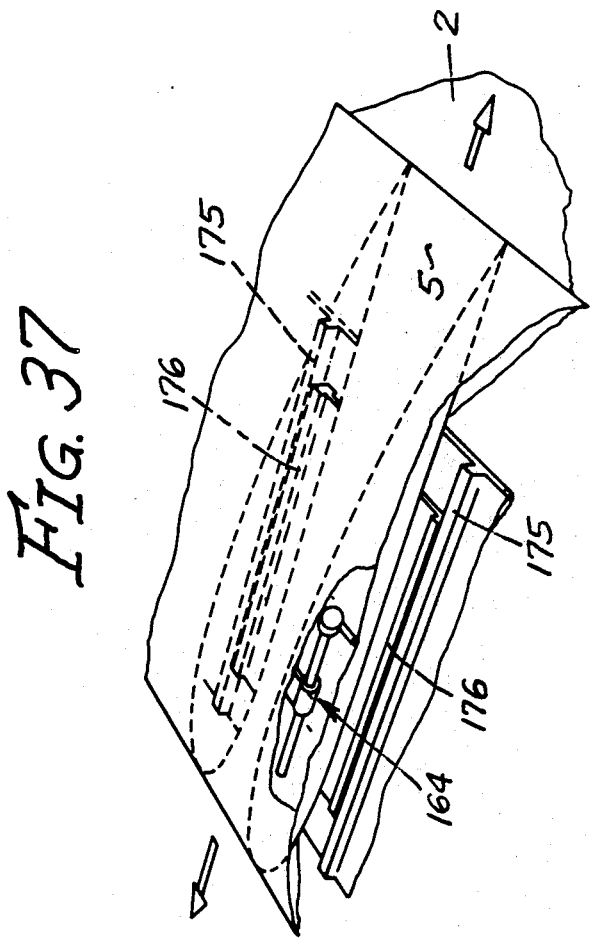
FIG. 37 is a view similar to FIGS. 30 and 33, but showing an arrangement with parallel rails mounted on both the wing and fuselage, and rolling element bearings between the pairs of rails.
Figure 38:
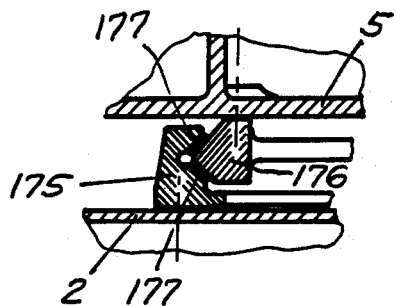
FIGS. 38, 39 and 40 are enlarged sectional views of three different rail and rolling element bearings that could be used with the structure shown in FIG. 37.
Figure 40:
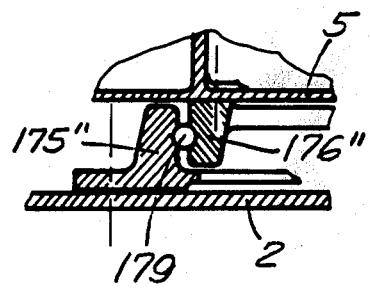
Figure 39:
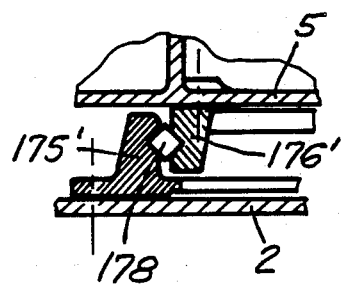

FIG. 37 shows still another structural connection between the wing middle box 5 and fuselage 2, which is generally similar in construction to that shown in FIG. 33, except for the cross-sectional shape of the rails 175 and companionate members 176. The rails 175 are parallel to one another and to the longitudinal axis of the fuselage, and are fixed to the top surface of the fuselage. The companionate members 176 are also parallel to and lie closely adjacent their respective rails 175 along the inner sides of the latter. The rails 175 and companionate members 176 may take the shape of any one of the three forms shown in FIGS. 38, 39 or 40. In FIG. 38, the rail has a V-shaped channel formed in its inner side wall, and the companionate member 176 also has a correspondingly V-shaped ridge with sides parallel to the opposing sides of the channel. Needle bearings 177 are disposed between opposed sides of the rail and its companionate member. This form is the preferred form where wing loading is relatively high, as the needle bearings 177 are capable of carrying higher loads than the roller or ball bearings shown in FIGS. 39 and 40. In FIG. 39, rail 175' and companionate member 176' have opposed V-shaped channels formed therein, with roller bearings 178 disposed between them, while in FIG. 40 the rail 175" and companionate member 176" have cylindrically curves channels formed in their opposed faces, with ball bearings 179 disposed between them.

The operation of the invention is believed to be more or less self-evident from the foregoin description. In the aircraft configuration, the controls are conventional and are located in the same positions as on other aircraft. The control wheel 24 operates the ailerons when turned up to 90° in either direction from the centered, neutral position, while the elevators are operated by pushing or pulling on the wheel. The rudder is operated by rudder pedals, and the brakes on the rear wheels are individually operated by pressing forwardly on the toe portion of the pedals. The throttle is manually controlled and the instruments are located conventionally. The wheels are retracted into the fuselage, and on landing, all four wheels are extended to the maximum extent.

When it is desired to convert the aircraft to the automotive configuration the first step is to retract the wings and tail structure, which is done by actuating a switch that turns on a motor (not shown) to drive the rotatable spar sections 47. In the case of those embodiments having a retractable propeller, the propeller may be retracted either independently or simultansously with the horizontal stabilizers. In either case, the transmission drive train would be disconnected from the propeller drive shaft and connected to the rear wheel drive shaft, using the shift lever 22. Next, the wheels are partially retracted to the automotive level. The control wheel shaft 90 is then locked against linear movement by engaging the clamp 159 with the tapered rim 158 on wheel 157. Lever 113 is pulled down to bear against the forward sides of the rudder pedals 107, 108 and thereby immobilize the same. All that remains is for the driver to move his right foot over to the accelerator pedal 111 and brake pedal 110. The gear shift lever 27 is moved to the desired position, and the automobile is ready to be driven in a conventional manner.

To convert the automobile back into an aircraft, the sequence of operations described above is reversed. Prior to takeoff, the selector lever 99 is moved to the takeoff position 100. The airplane is then accelerated down the runway, holding the control wheel 24 in a forward position until takeoff speed is reached. At this point, wheel 24 is pulled rearwardly, operating the elevator and simultaneously causing the rear wheels 10, 11 to partially retract, placing the fuselage in the high-angle-of-attack attitude shown in FIG. 18. The airplane then lifts off the ground and is airborne.

Among the outstanding advantages of the invention is the compact, unobtrusive way that the telescopically retracted wing is stored when the vehicle is in the automotive configuration. As described, and shown in the drawings, the wing is telescoped directly into and is stored within the middle box, which is built into the roof of the fuselage well above the passenger compartment so that the space between the front and rear seats is substantially unobstructed, as in conventional automobiles. This allows the passengers to talk freely with one another, with the feeling of "togetherness", or as being one group in a more or less special situation, during flight or automotive travel. It also allows for the physical exchange of things such as papers, snacks, beverages and the like. Moreover, with the wing compactly stored in the middle box on the roof, the sides of the vehicle are completely unobstructed for ease of entrance and exit. All of this is made possible by the telescopic construction of the wing, which reduces the volume of the retracted wing to an absolute minimum, using a relatively simple and uncomplicated retracting mechanism.

While I have shown and described in considerable detail what I believe to be the preferred forms of my invention, it will be understood by those skilled in the art that the invention is not limited to such details but may take various other forms within the scope of the claims that follow.

What I claim is:

1. A convertible fixed wing aircraft comprising, in combination:
    a fuselage of generally rectangular planform having a pair of steerable front wheels and a pair of rear wheels, said fuselage enclosing a passenger compartment having front and rear seats;
    a middle box attached to the roof of said fuselage substantially over the center of gravity of the loaded vehicle and elevated above said passenger compartment so that the space between front and rear seats is substantially unobstructed;
    a telescopic wing attached to said middle box and projecting laterally therefrom on opposite sides, said wing comprising a plurality of wing sections that telescope into one another, thereby retracting the wing from an extended flight configuration to a retracted automotive configuration telescoped within the middle box wherein the wing tips are spaced apart no more than the allowable highway width limitation;
    horizontal and vertical stabilizer means mounted at the rear end of said fuselage and retractable to a total width no greater than the allowable highway width limitation;
    energy absorbing bumpers fixed to the front and rear ends of said fuselage beyond the fore and aft extremities of the retracted components;
    a propeller;
    an engine and transmission means alternatively connecting the engine to either said propeller or to one of said pairs of wheels; and
    control means for controlling the aircraft when in the flight configuration, or for controlling the vehicle when in the automotive configuration.

2. A convertible fixed wing aircraft as in claim 1, wherein said horizontal and vertical stabilizer means comprises a pair of airfoils disposed in V-tail configuration, said airfoils being telescopically retracted into the interior of said fuselage.

3. A convertible fixed wing aircraft as in claim 1, wherein said vertical stabilizer means comprises a pair of laterally spaced vertical stabilizer airfoils located adjacent opposite sides of the fuselage, with a horizontal airfoil attached to the top ends of the vertical stabilizer airfoils and extending between them;
    said propeller being disposed between said vertical stabilizer airfoils and under said horizontal airfoil; and
    said horizontal stabilizer means comprising laterally extending horizontal stabilizer airfoils telescopically retractable into the interior of said fuselage.

4. A convertible fixed wing aircraft as in claim 1, wherein said vertical stabilizer means comprises a pair of laterally spaced vertical stabilizer airfoils telescopically retractable into the interior of the fuselage;
    said propeller being disposed between said vertical stabilizer airfoils and retractable into the interior of the fuselage; and
    said horizontal stabilizer means comprising laterally extending horizontal stabilizer airfoils telescopically retractable into the interior of the fuselage.

5. A convertible fixed wing aircraft as in claim 1, wherein said engine is mounted in the front end of the fuselage, and said propeller is retractably mounted at the rear end of the fuselage;

said transmission means including a gear box mounted in the rear of the fuselage, and connected to both said propeller and said rear wheels for selectively driving one or the other; and a drive shaft connecting said engine to said gear box.

6. A convertible fixed wing aircraft as in claim 1, wherein said wing is adjustable in the fore and aft direction along the longitudinal axis of the fuselage by means consisting of a pair of laterally spaced, parallel, fore and aft extending rails;

rolling element bushings slidably mounted on each of said rails;

said rolling element bushings and said rails connecting said middle box and wing to the top of said fuselage;

a nut attached to said middle box and having a threaded aperture extending parallel to said rails;

a lead screw extending through said nut;

a worm wheel mounted on one end of said lead screw;

a transversely disposed worm shaft meshing with said worm wheel; and means for turning said worm shaft so as to shift said wing longitudinally along said rails, said worm shaft and worm wheel providing an irreversible driving means for shifting said wing.

7. A convertible fixed wing aircraft as in claim 1, wherein elevators are attached to said horizontal stabilizer means, and said control means comprise a rotatable shaft that is also movable linearly, said shaft being connected to said steerable front wheels so as to steer the same when the shaft is turned, and also connected to said elevators so as to move the same when the shaft is moved linearly;

a control wheel attached to said shaft;

a member mounted on said shaft ahead of said control wheel, said member being rotatable about said shaft and being fixed against linear movement with respect to the shaft; and a locking device engageable with said member when the vehicle is in the automotive configuration so as to restrain said shaft against linear movement while permitting free rotation of the shaft to steer said front wheels.

8. A convertible fixed wing aircraft as in claim 1, wherein said wheels are retractable by means of a wheel retraction system, and said horizontal stabilizer means includes movable elevators, and said control means includes a control wheel mounted for rotational movement and for linear movement along the axis of rotation, said control wheel being connected to said front wheels to steer the same, and also connected to said elevators so as to raise or lower them when the wheel is moved linearly; and further including means responsive to rearward linear movement of said control wheel for simultaneously raising the elevators and partially retracting said rear wheels so as to position said fuselage at the proper angle of attack for takeoff.

9. A convertible fixed wing aircraft as in claim 8, wherein said means responsive to linear movement of the control wheel includes a control member movable between takeoff position and other positions, said control member when in said takeoff position activating said rear wheel retraction system, and when in said other positions deactivating said rear wheel retraction system 10. A convertible fixed wing aircraft as in claim 1, wherein said wheels are mounted on arms that are hinged to said fuselage for swinging movement about transverse axes located a substantial distance ahead of the respective wheel axes;

said arms having flat surfaces on their bottom sides which, when said wheels are extended, project downwardly and rearwardly from the hinge axis at an angle such that upon landing in water, said flat surfaces serve as inclined planing surfaces creating hydrodynamic lift to carry a portion of the aircraft weight; and said arms being retractable into compartments formed in the underside of said fuselage, and said flat surfaces on said arms serving as fairings covering said compartments in flight configuration.

11. A convertible fixed wing aircraft as in claim 10, wherein said flat surfaces are generally triangular in shape, being substantially wider at the hinge axes than at the wheel axes.

* * * * *